(12) United States Patent
Espinosa

(10) Patent No.: US 10,337,185 B2
(45) Date of Patent: Jul. 2, 2019

(54) HOLD DOWN SYSTEM WITH DISTRIBUTED LOADING FOR BUILDING WALLS

(71) Applicant: CETRES HOLDINGS, LLC, Jackson, WY (US)

(72) Inventor: Thomas M Espinosa, Snohomish, WA (US)

(73) Assignee: CETRES HOLDINGS, LLC, Jackson, WY (US)

( * ) Notice: Subject to any disclaimer, the term of this patent is extended or adjusted under 35 U.S.C. 154(b) by 0 days.

(21) Appl. No.: 15/265,613

(22) Filed: Sep. 14, 2016

(65) Prior Publication Data

US 2017/0089063 A1    Mar. 30, 2017

Related U.S. Application Data

(60) Provisional application No. 62/219,005, filed on Sep. 15, 2015.

(51) Int. Cl.
  *E04B 1/41* (2006.01)
  *E04B 2/70* (2006.01)
  (Continued)

(52) U.S. Cl.
  CPC ............ *E04B 1/4157* (2013.01); *E02D 35/00* (2013.01); *E04B 1/2604* (2013.01);
  (Continued)

(58) Field of Classification Search
  CPC ........ E04B 1/4157; E04B 1/2604; E04B 2/70; E04B 1/4121; E04H 9/021; E04H 9/14; E02D 35/00
  (Continued)

(56) References Cited

U.S. PATENT DOCUMENTS 3,247,635 A * 4/1966 Burns .................. E04B 1/2604
                                                      52/223.13
3,270,471 A * 9/1966 Middendorf ............ E04C 5/125
                                                      52/223.13
(Continued)

*Primary Examiner* — Joshua K Ihezie
(74) *Attorney, Agent, or Firm* — Shlesinger, Arkwright & Garvey LLP

(57) ABSTRACT

A hold down system for a building wall comprises a first rigid member and a second rigid member, the second rigid member being vertically spaced apart from the first rigid member, the first rigid member is supported on a horizontal member of a stud wall, the first and second rigid members including first and second openings, respectively; a tie-rod with a lower end portion for being anchored to an anchorage, the tie-rod extending transversely through the first and second openings, the tie-rod dividing the first and second rigid members into a first lateral section on one side of the tie-rod and a second lateral section on a diametrically opposite side of the tie-rod; first support and second support disposed between the first and second rigid members, the first support being disposed in the first lateral section, the second support being disposed in the second lateral section, the tie-rod extending through the first and second rigid members outside of the first support or the second support; and a nut threaded to the tie-rod, the nut exerting pressure on the second rigid member to place the tie rod under tension loading, the tension loading is transferred by the second rigid member to the first and second supports to subject the first and second supports to compression loading, thereby causing the first rigid member to press on the horizontal member of the stud wall via the first and second lateral sections of the first rigid member, thus distributing the compression loading.

40 Claims, 28 Drawing Sheets

(51) Int. Cl.
*E04H 9/02* (2006.01)
*E04H 9/14* (2006.01)
*E02D 35/00* (2006.01)
*E04B 1/26* (2006.01)
*E04B 1/98* (2006.01)
*E04B 1/35* (2006.01)
*F16B 31/04* (2006.01)
*F16B 37/08* (2006.01)
*F16B 43/02* (2006.01)

(52) U.S. Cl.
CPC .............. *E04B 1/4121* (2013.01); *E04B 2/70* (2013.01); *E04H 9/021* (2013.01); *E04H 9/14* (2013.01); *E04B 1/98* (2013.01); *E04B 2001/2644* (2013.01); *E04B 2001/2688* (2013.01); *E04B 2001/3583* (2013.01); *F16B 31/043* (2013.01); *F16B 37/0864* (2013.01); *F16B 43/02* (2013.01)

(58) Field of Classification Search
USPC .......... 52/293.3, 223.13, 223.14, 705, 167.1, 52/295, 92.2
See application file for complete search history.

(56) References Cited

U.S. PATENT DOCUMENTS

| | | | | |
|---|---|---|---|---|
| 5,467,569 A * | 11/1995 | Chiodo | ............ | E04B 1/41 52/295 |
| 5,505,033 A * | 4/1996 | Matsuo | ............ | E02D 27/42 52/169.9 |
| 5,678,382 A * | 10/1997 | Naito | ............ | E02D 27/42 52/295 |
| 6,494,654 B2 * | 12/2002 | Espinosa | ............ | E04C 5/08 403/105 |
| 7,677,522 B2 * | 3/2010 | Bakos | ............ | E02D 27/42 248/354.1 |
| 7,762,030 B2 * | 7/2010 | Espinosa | ............ | E02D 27/34 411/432 |
| 8,186,924 B1 * | 5/2012 | Espinosa | ............ | E04B 1/2604 411/353 |
| 8,511,019 B2 * | 8/2013 | Espinosa | ............ | E02D 27/34 411/432 |
| 2006/0156657 A1 * | 7/2006 | Commins | ............ | E04B 1/2604 52/223.13 |
| 2007/0107339 A1 * | 5/2007 | Matsumoto | ............ | E02D 27/32 52/295 |
| 2013/0340366 A1 * | 12/2013 | Gray | ............ | E04B 1/26 52/223.14 |

\* cited by examiner

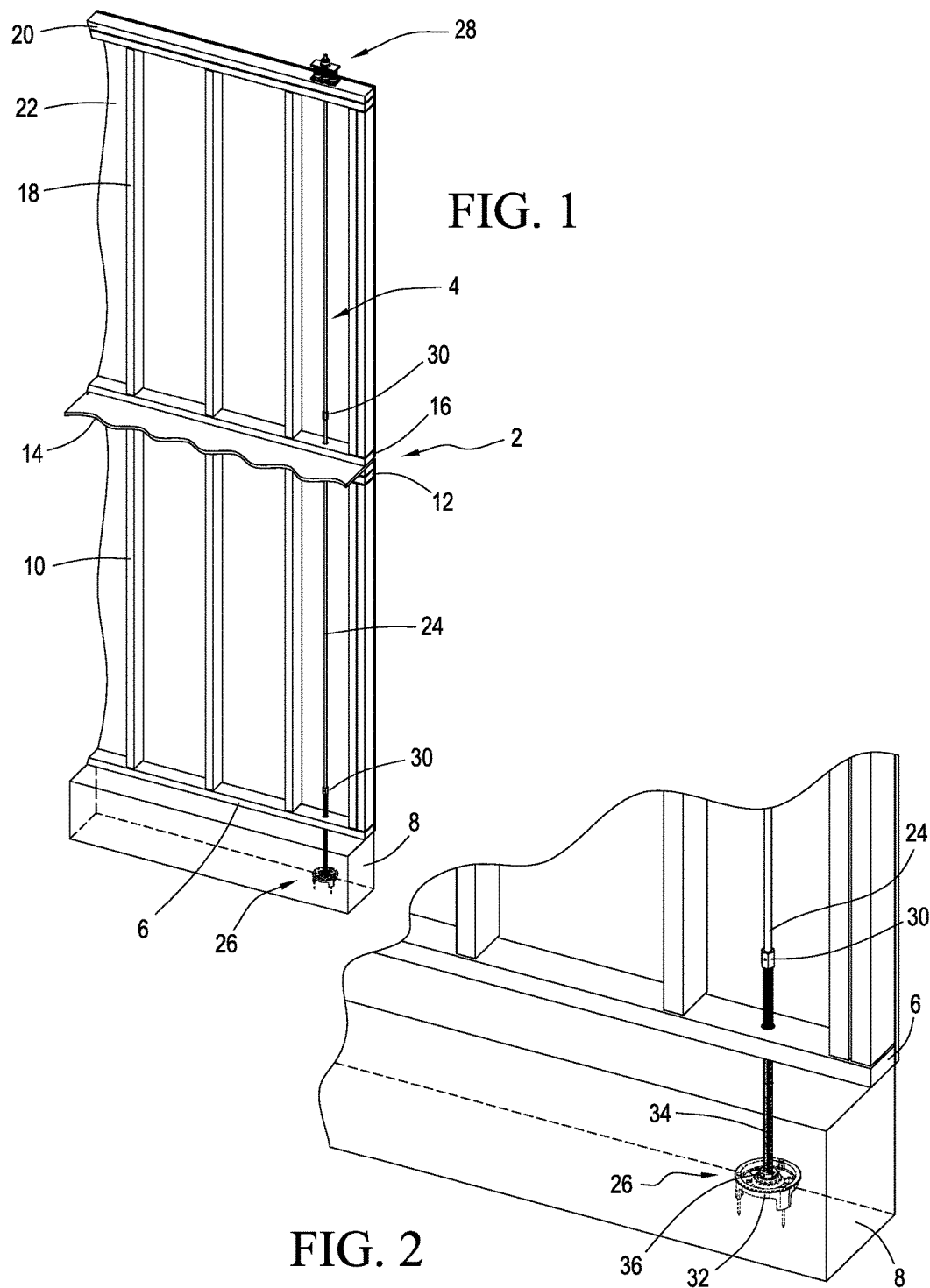

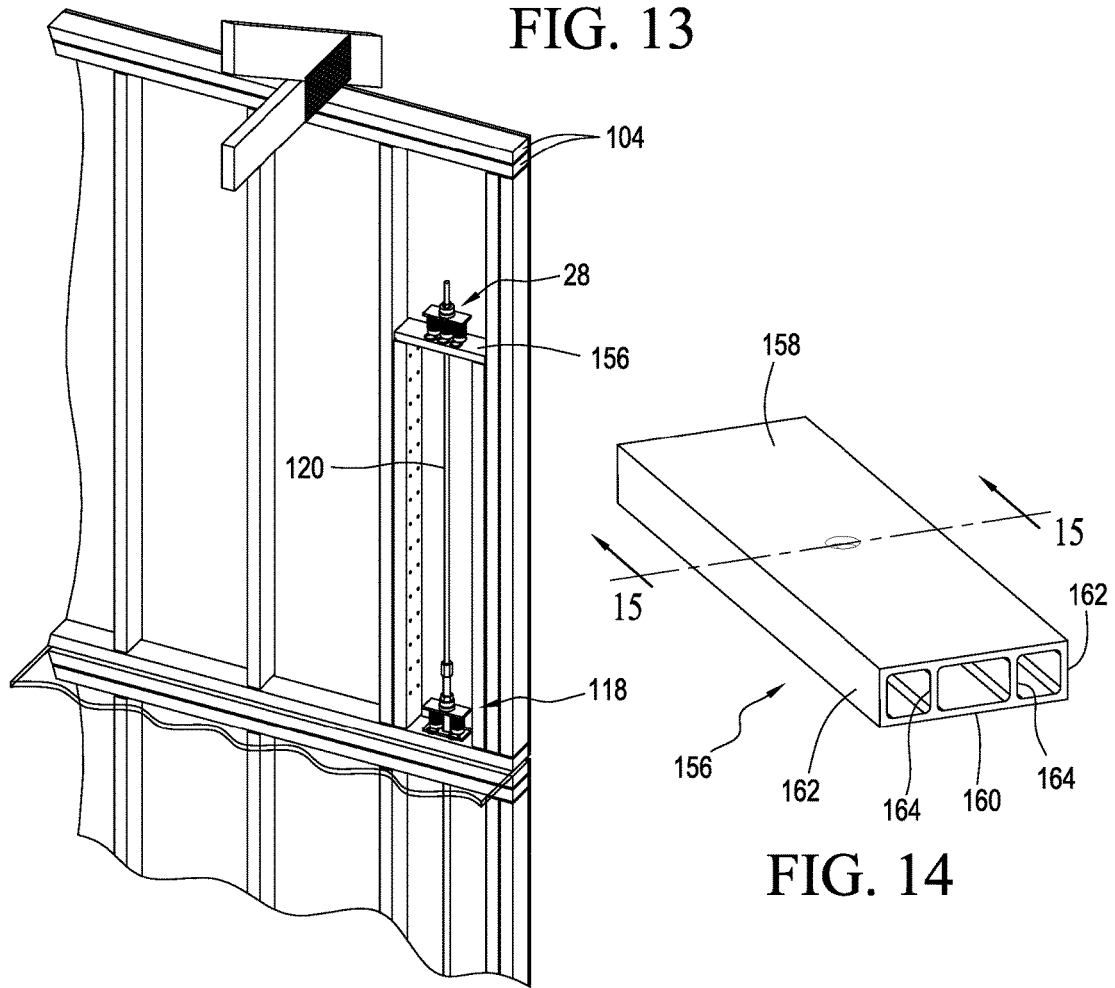
FIG. 13
FIG. 14
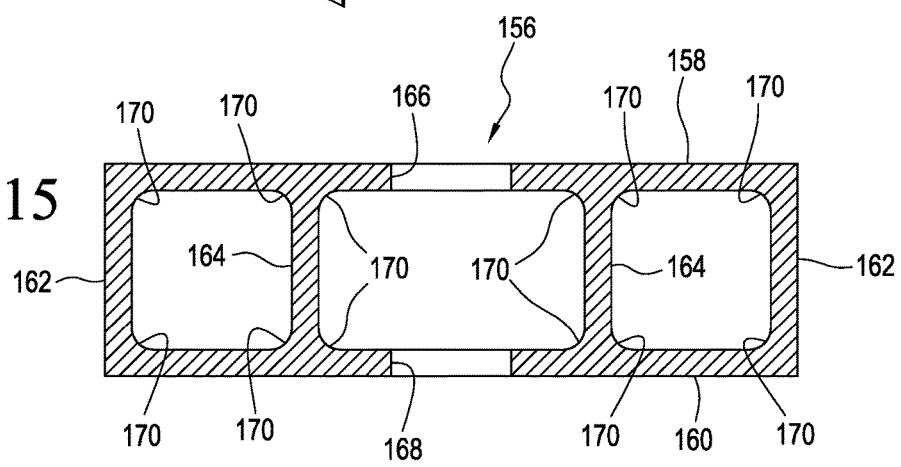
FIG. 15

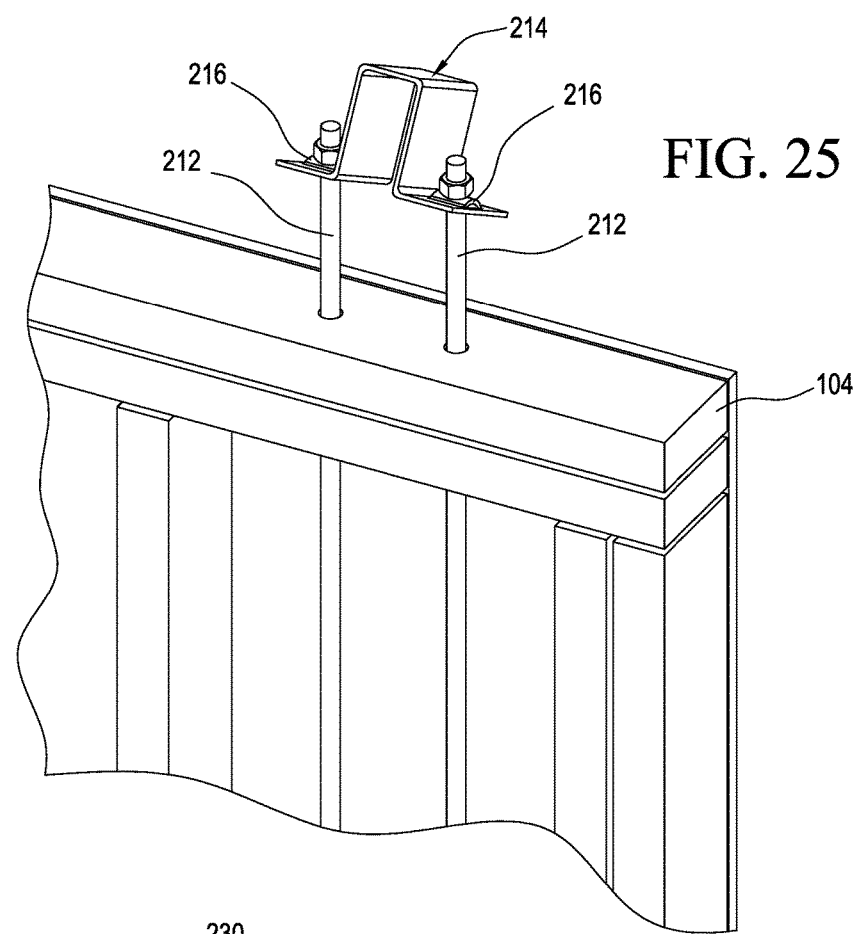
FIG. 25
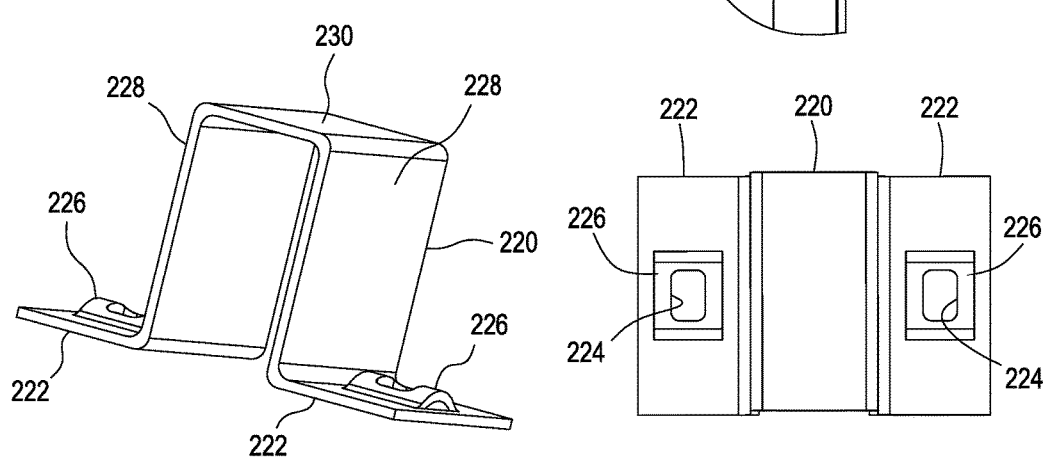
FIG. 26
FIG. 27

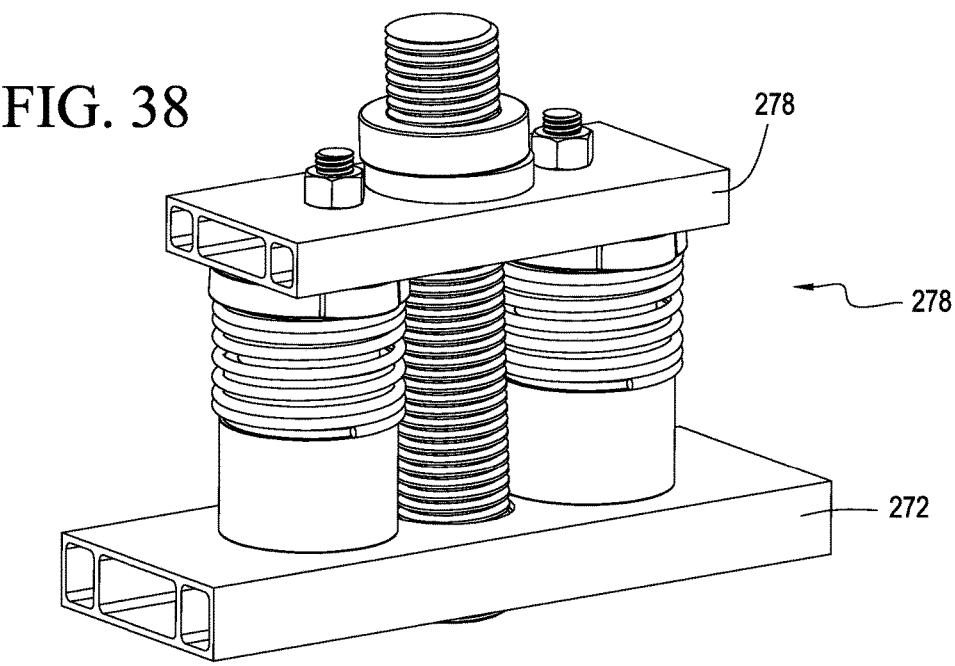
FIG. 38
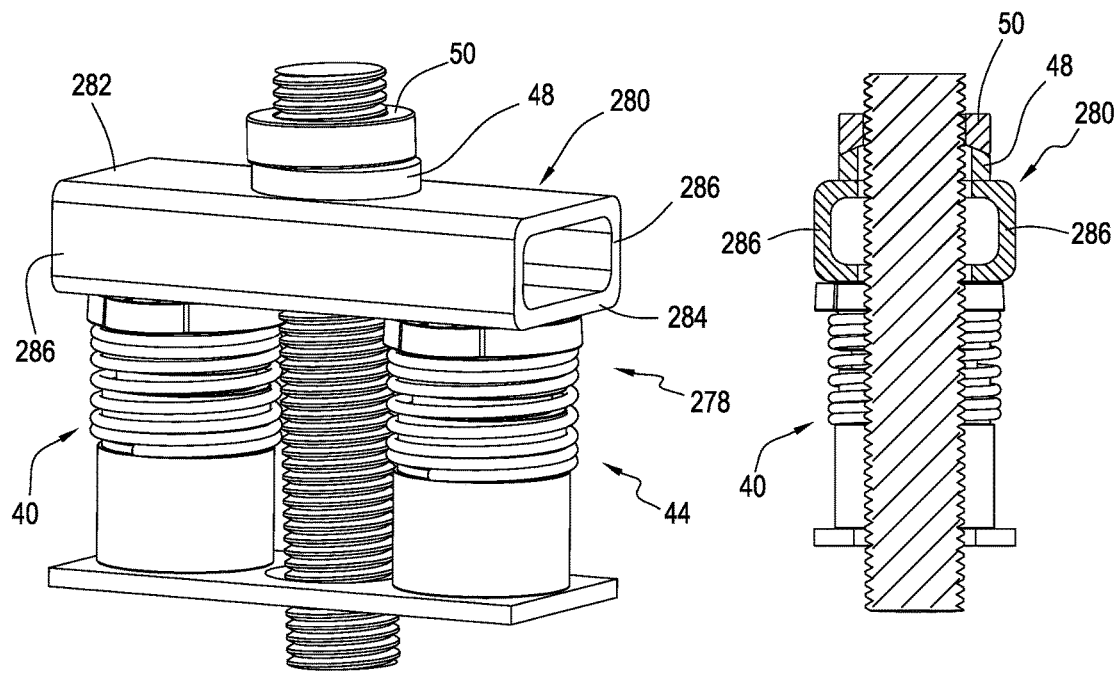
FIG. 39
FIG. 40

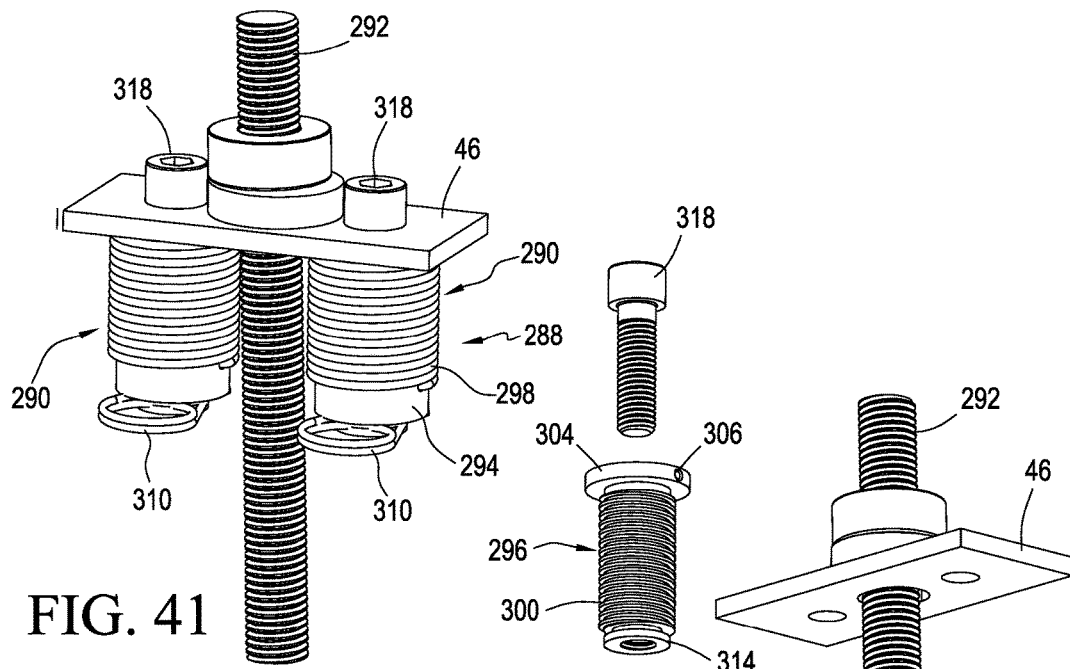
FIG. 41
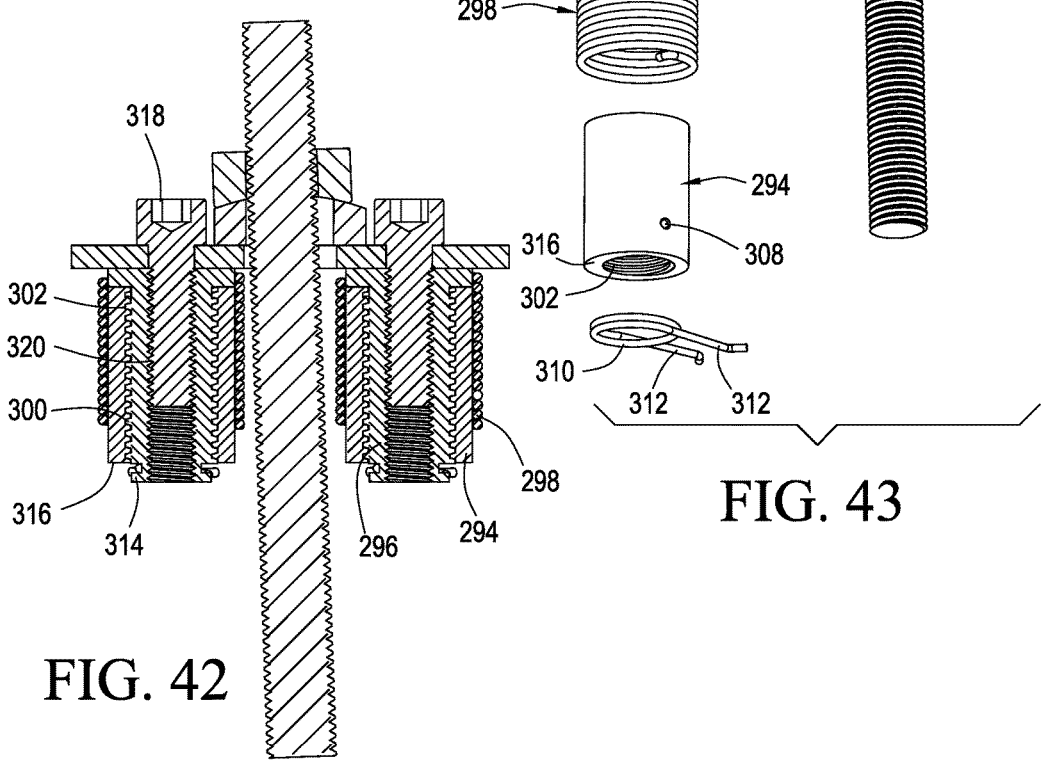
FIG. 42
FIG. 43

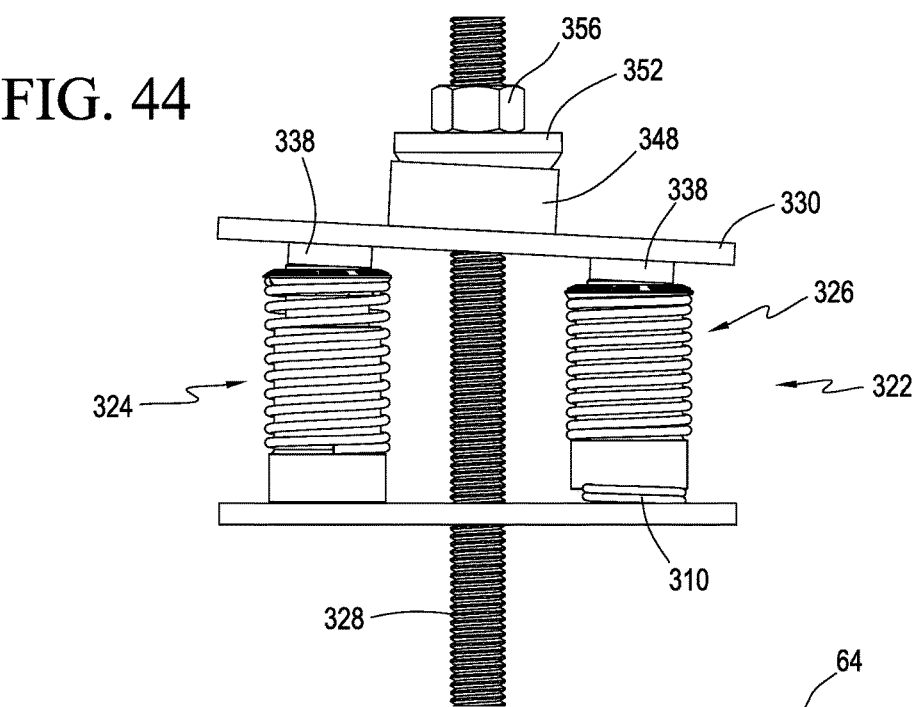
FIG. 44
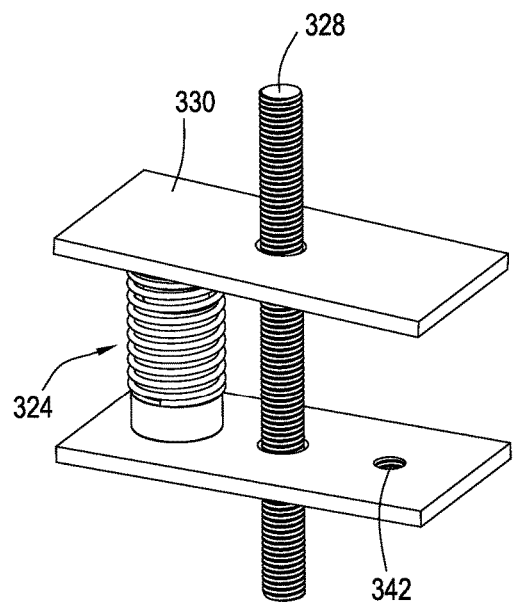
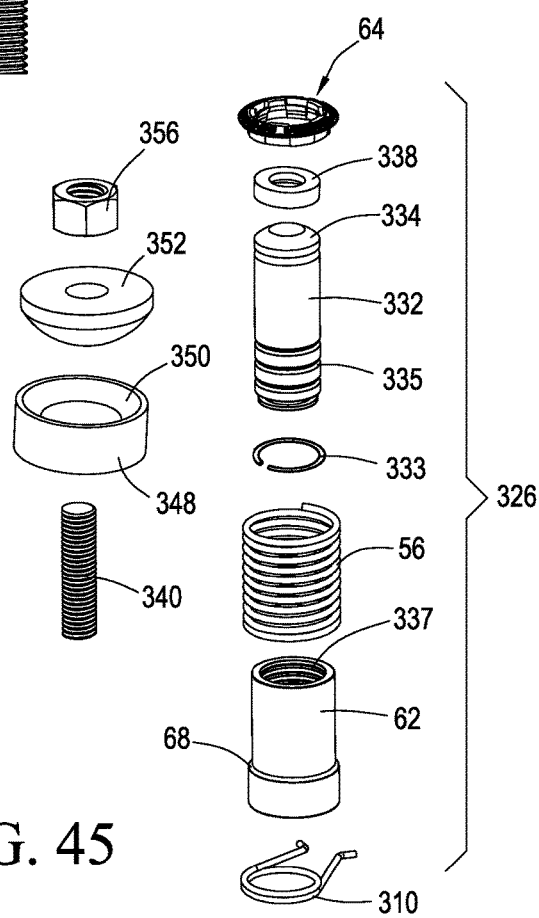
FIG. 45

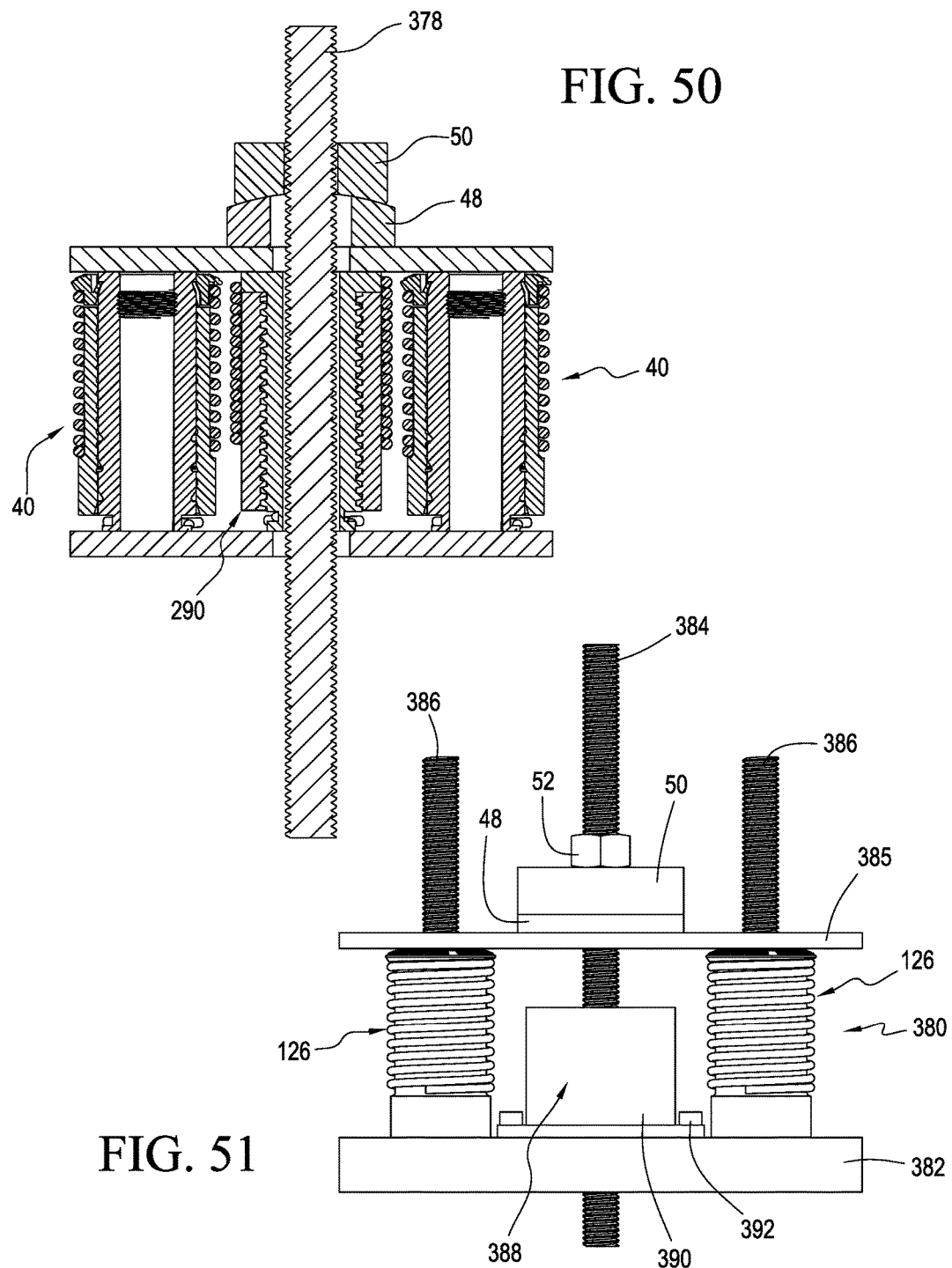

HOLD DOWN SYSTEM WITH DISTRIBUTED LOADING FOR BUILDING WALLS

RELATED APPLICATION

This is a nonprovisional application of provisional application Ser. No. 62/219,005, filed Sep. 15, 2015, hereby incorporated by reference.

FIELD OF THE INVENTION

The present invention is generally directed to a tension hold down system used in walls in light frame construction to resist uplift and to compensate for wood shrinkage in wood frame construction and compression loading.

SUMMARY OF THE INVENTION

The present invention provides a hold down system for a building wall, comprising a first rigid member and a second rigid member, the second rigid member being vertically spaced apart from the first rigid member, the first rigid member is supported on a horizontal member of a stud wall, the first and second rigid members including first and second openings, respectively; a tie-rod with a lower end portion for being anchored to an anchorage, the tie-rod extending transversely through the first and second openings, the tie-rod dividing the first and second rigid members into a first lateral section on one side of the tie-rod and a second lateral section on a diametrically opposite side of the tie-rod; first support and second support disposed between the first and second rigid members, the first support being disposed in the first lateral section, the second support being disposed in the second lateral section, the tie-rod extending through the first and second rigid members outside of the first support or the second support; and a nut threaded to the tie-rod, the nut exerting pressure on the second rigid member to place the tie rod under tension loading, the tension loading is transferred by the second rigid member to the first and second supports to subject the first and second supports to compression loading, thereby causing the first rigid member to press on the horizontal member of the stud wall via the first and second lateral sections of the first rigid member, thus distributing the compression loading.

BRIEF DESCRIPTION OF THE DRAWINGS

FIG. 1 is a perspective view of a building wall using a hold down system embodying the present invention.

FIG. 2 is an enlarged perspective view of an anchor assembly in FIG. 1.

FIGS. 11-13 are alternative embodiments of the hold down system shown in FIG. 7.

FIG. 14 is a perspective view of a cross-member used in the system shown in FIG. 13.

FIG. 15 is a cross-sectional view along line 15-15 in FIG. 14.

FIGS. 25 and 26 are a perspective view of a bracket in the slack absorber assembly in the hold down system in FIG. 24.

FIG. 27 is a top view of the bracket shown in FIGS. 25-26.

FIG. 38 is a perspective view of a slack absorber assembly used in a hold down system in any of the building walls shown above.

FIG. 39 is a perspective view of a slack absorber assembly used in a hold down system in any of the building walls shown above.

FIG. 40 is a cross-sectional view of the slack absorber assembly shown in FIG. 39.

FIG. 41 is a perspective view of a slack absorber assembly used in a hold down system in any of the building walls shown above.

FIG. 42 is a cross-sectional view of the slack absorber assembly shown in FIG. 41.

FIG. 43 is an assembly view of the slack absorber assembly shown in FIG. 41.

FIG. 44 is a perspective view of a slack absorber assembly used in a hold down system in any of the building walls shown above.

FIG. 45 is an assembly view of the slack absorber assembly shown in FIG. 44.

FIG. 50 is a cross-sectional view of the slack absorber assembly shown in FIG. 49.

FIG. 51 a perspective view of a slack absorber assembly used in a hold down system in any of the building walls shown above.

DETAILED DESCRIPTION OF THE INVENTION

Figure 3:
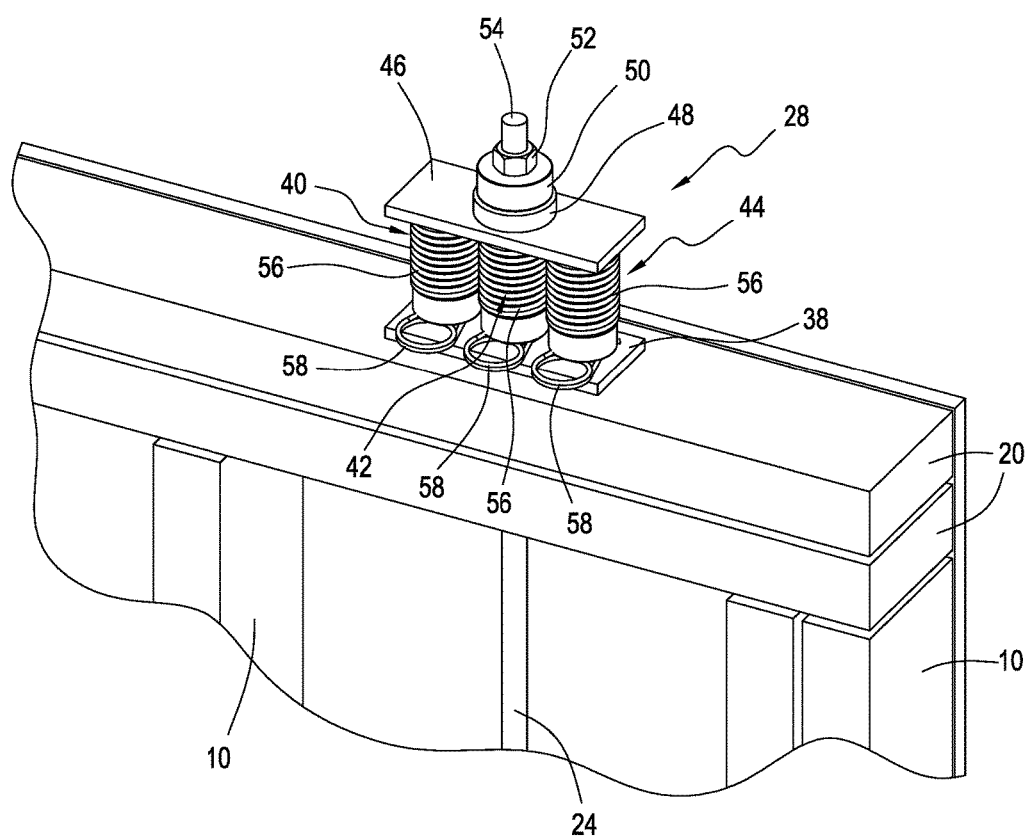
FIG. 3 is a perspective view of a slack absorber assembly of the hold down system in FIG. 1.

A two-story building wall 2 using a hold down system 4 embodying the present invention is disclosed in FIG. 1. The building wall 2 includes a base plate 6 supported by a concrete foundation 8, a plurality of studs 10 attached to the base plate 6, a double top plate 12 attached to the studs 10, a plurality of floor joists (not shown, but see FIGS. 16 and 17) supported on the double top plate 12, a subfloor 14 supported on the floor joists, a bottom plate 16 supported on the subfloor 14, a plurality of studs 18 attached to the bottom plate 16, a double top plate 20 attached to the studs 18 and wall sheathing 22 attached to the studs 10 and 22, the bottom plates 6 and 16, and the top plates 12 and 20.

The hold down system 4 includes a tie rod 24 attached at one end to an anchor assembly 26 embedded in the concrete foundation 8. The other end of the tie rod 24 is attached to a slack absorber assembly 28 supported by the top plate 20. The tie rod 24 is disposed within the wall 2, extending through openings in the base plates 6 and 16 and the top plates 12 and 20. The tie rod 24 may made of multiple sections joined together into one with couplers 30.

Referring to FIG. 2, the anchor assembly 26 includes an anchor support 32, an anchor rod 34 attached to the anchor support 32 and an anchor body 36 in the form of a hex nut threaded to the anchor rod 34. The anchor rod 34 extends outside the foundation 8 through the base plate 6 and connects to the tie rod 24 by means of the coupler 30. The coupler 30 is threadedly attached to the anchor rod 34 and the tie rod 24.

The support 32 is described in U.S. Pat. No. 8,943,777, herein incorporated by reference. Other standard supports may also be used.

The anchor body 36 may be of any shape that is suitable for embedment in concrete and able to resist the uplift and shear loads of the building wall 2 during a storm, hurricane or earthquake. Other examples of the anchor body 36 are described in U.S. Pat. Nos. 8,943,777 and 9,097,001, hereby incorporated by reference.

Referring to FIG. 3, the slack absorber assembly 28 includes a bottom rigid member 38 supported by the top plate 20, a left side expansion device 40, a center expansion device 42, a right side expansion device 44, a top rigid member 46, a male washer 48, a female washer 50 and a nut 52. The nut 52 is threaded to an end portion 54 of the tie rod 24 to keep the expansion devices 40, 42 and 44 between the rigid members 38 and 46. Each of the devices 40, 42 and 44 includes a spring 56 under compression to tend to urge the top rigid member 46 away from the bottom rigid member 38, thereby to take up any slack that may later develop in the tie rod 24 due to later shrinkage of the wall 2 due to settling, drying, etc. The springs 56 advantageously keep the tie rod 24 under tension. Removable clips 58 are used to keep the springs 56 from expanding during installation and are removed after installation of the devices 40, 42 and 44 to activate the springs 56. The devices 40, 42 and 44 are described in U.S. Pat. No. 7,762,030, hereby incorporated by reference.

The expansion devices 40, 42 and 44 provide support to the top rigid member 46 and transfer the load to the bottom rigid member 38. The load from the nut 52 as it applies tension load on the tie rod 24 is advantageously distributed to the expansion devices 40, 42 and 44 and thence to the bottom rigid member 38. The expansion devices 40 and 44 advantageously carry load offset from the tie rod 24, thereby distributing the load over a larger area. The load is distributed over three expansion devices, thereby allowing each of the expansion devices 40, 42 and 44 to be of smaller sizes that will fit in the limited space inside a wall than if a single expansion device were used.

Figure 4:
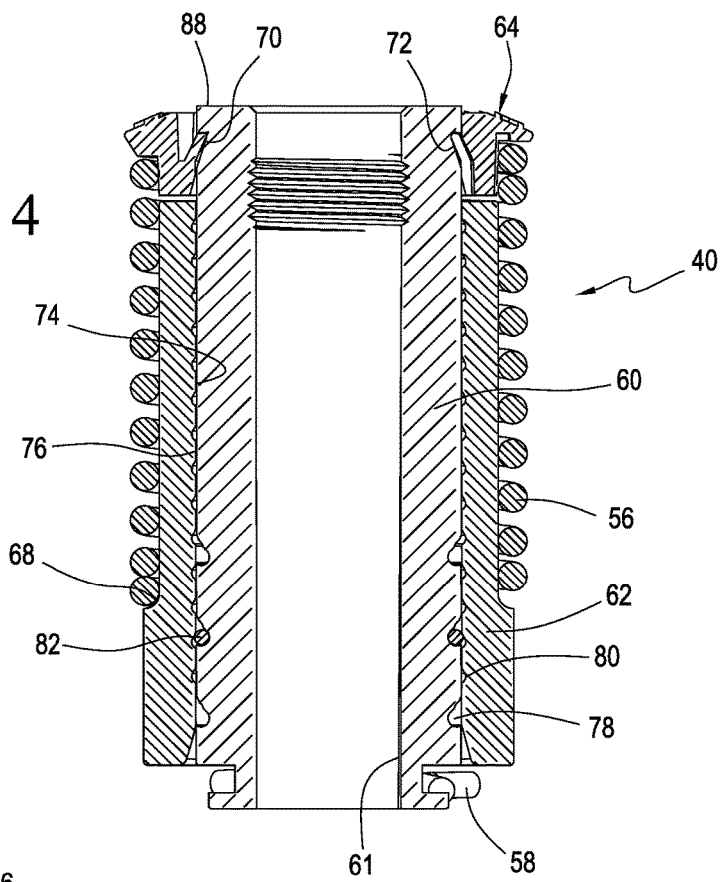
FIG. 4 is a cross-sectional view along a longitudinal axis of one of the expansion devices shown in FIG. 3.
Figure 5:
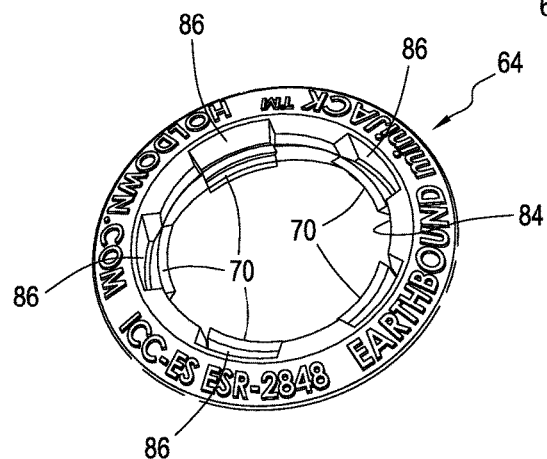
FIG. 5 is perspective view of a retainer ring shown in FIG. 4.

Referring to FIG. 4, the expansion device 40 is shown in cross-section, which also applies to the other expansion devices 42 and 44. Accordingly, only the expansion device 40 will be described.

The expansion device 40 includes an inner cylindrical member 60, which is disposed within and slidable in an upward direction relative to an outer cylindrical member 62 under the action of the spring 56. The inner cylindrical member 60 includes an axial opening 61. The inner and cylindrical members 60 and 62 are lockable relative to one another in a downward direction of the inner cylindrical member 60 to prevent the spring 58 from compressing to its prior position after the spring 58 has expanded to take up the slack in the tie-rod 24.

A retainer ring 64 is attached to an upper portion of the inner cylindrical member 60 to keep the spring 58 wound around the outer cylindrical member 62 at one end. The spring 58 is wound around an annular recess 66 around the outer cylindrical member 62 and an annular shoulder 68 at one end of the recess 66 keeps the spring 56 in place. The spring 58 is preferably helical. The removable clip 58 advantageously prevents movement between the inner cylindrical member 60 and the outer cylindrical member 62 during installation of the expansion device 40.

The retainer ring 64 includes flexible fingers 70 that are received in an annular recess 72 at the upper end portion of the inner cylindrical member 60.

The inner cylindrical member 60 and the outer cylindrical member 62 have opposing cylindrical walls 74 and 76, respectively, with corresponding receiving volumes 78 and 80, respectively. A resilient member 82 is disposed between the opposing cylindrical walls 74 and 76 and is biased to occupy one of the receiving volumes 80. The receiving volumes 78 and 80 are configured in cross-section such that when the inner cylindrical member 60 is moved upwardly, the resilient member 82 is shifted into and fully received in one of the receiving volumes 78. The receiving volumes 78 and 80 are further configured in cross-section such that when the inner cylindrical member 60 is subjected to a downward force, the resilient member 82 is only partially received within one of the receiving volumes 80 to preclude movement of the inner cylindrical member 60. The resilient member 82 is preferably a split ring.

The retainer ring 64 is preferably made of plastic with the fingers 70 disposed inwardly and distributed around the opening 84. When installing the retainer ring 64 to the inner cylindrical member 60, the retainer ring 64 is pushed downwardly at the upper end of the inner cylindrical member 60. The fingers 70 will flex and bend back into respective recesses 86 as the retainer ring 64 travels downwardly and then spring back and engage the annular recess 72 when they get past the upper edge 88 of the inner cylindrical member 60.

Figure 6:
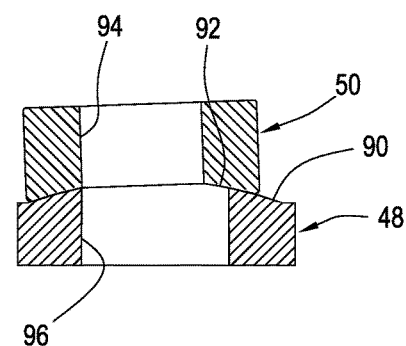
FIG. 6 is a cross-sectional of the washers shown in FIG. 3.

Referring to FIG. 6, the male washer 48 includes a spherical convex top surface 90 that mates with a bottom spherical concave surface 92 of the female washer 50. The washer 50 has an opening 94 configured for the diameter of the tie rod 24. The washer 48 has an opening 96 that is larger than the opening 94 to allow the washer 50 to move to one side or the other side when the tie rod 24 is not installed perfectly vertical. The mating surfaces 90 and 92 advantageously remain in contact as the top rigid member 46 rises unevenly to the left or to the right due to an uneven expansion of one of the expansion devices 40 and 44. The washers 48 and 50 advantageously remain flat with the top rigid member 46 and the nut 52 even when the tie rod 24 is not perfectly vertical or perpendicular with the top plates 20, and hence the bottom rigid member 38 and the top rigid member 46. The bottom rigid member 38 and the top rigid member 46 also have oversize openings (through which the tie rod 24 extends) similar to the opening 96 to accommodate the tie rod 24 not being perfectly vertical.

The opening 94 of the washer 50 may be threaded to mate with the thread on the tie rod 24 to advantageously provide the function of the nut 52 so that the nut 52 can be eliminated to reduce the number of components, thereby saving cost and simplifying inventory. The washer 50 may be provided with hexagonal flat surfaces in the manner of a standard nut for use with a wrench or other standard tightening tool.

Figure 11:
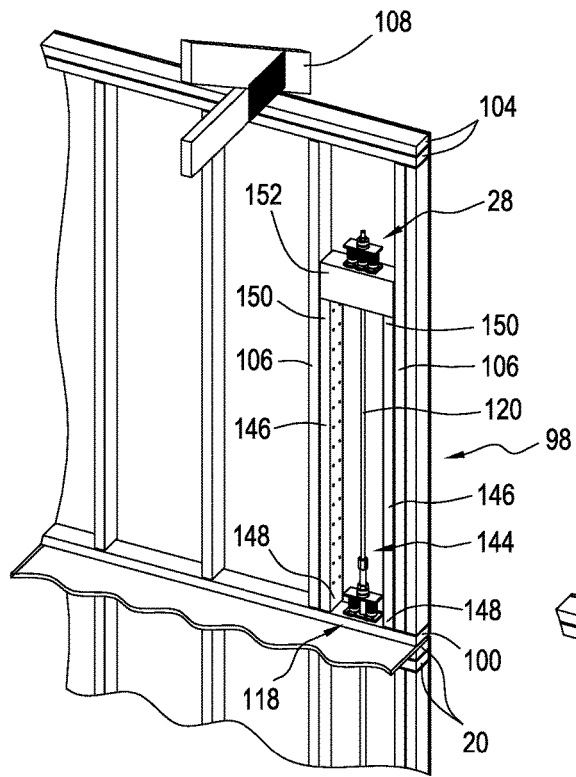
Figure 12:
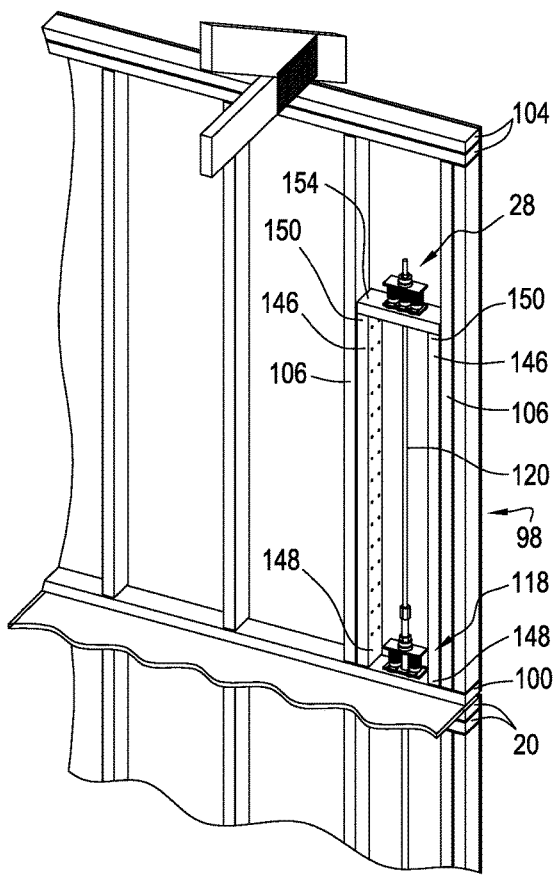

The bottom rigid member 38 and the top rigid member 46 are preferably flat and planar and made of metal. The bottom rigid member 38 and the top rigid member 46 may also be made of hollow metal, such as shown in FIGS. 14 and 39. It should be understood that the top rigid member 46 does not have to be a separate unit but may be built into the expansion devices 40 and 44. Similarly, the bottom rigid member 38 may be part of the wall structure that provides the function of a bearing surface so that it does not have to be provided separately, such as a tall wood block as shown in FIG. 11 or a metal cross member as shown in FIGS. 12 and 13. It should be understood that the bottom rigid member 38 and the top rigid member 46 are intended to mean any structure that provides a bearing surface, whether separate or integrated with the expansion devices.

Figure 7:
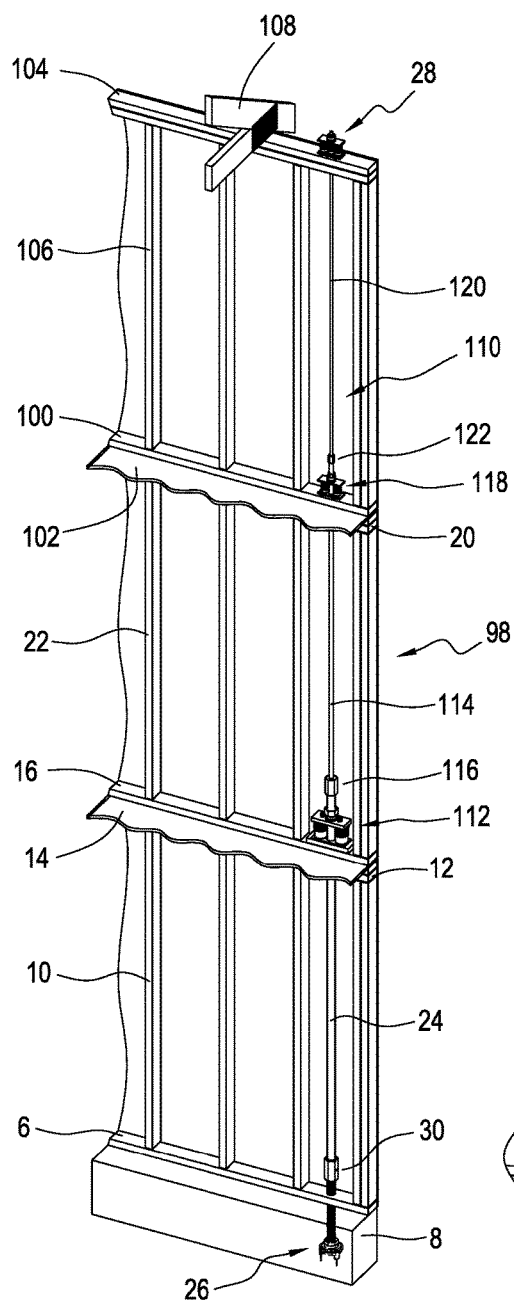
FIG. 7 is a perspective view of a building wall reinforced by a hold down system embodying the present invention.

Referring to FIG. 7, a three-story building wall 98 is disclosed. The wall 98 is similar to the wall 2 of FIG. 1, but with the addition of a third story. A bottom plate 100 is disposed on a subfloor 102. Double top plates 104 are secured to the top ends of studs 106. Roof truss 108 is supported on top of the double top plates 104.

A hold down system 110 is used to reinforce the building wall 98 against uplift and shear forces. The system 110 includes the anchor assembly 26; the tie rod 24 connected to the anchor assembly 26; a slack absorber assembly 112 connected to the tie rod 24 to take up any slack that may develop later in the tie rod 24; a tie rod 114 connected to the tie rod 24 through a coupler 116; a slack absorber assembly 118 connected to the tie 114 to take up any slack that may develop later in the tie rod 114; a tie rod 120 connected to the tie rod 114 with a coupler 122; and the slack absorber assembly 28.

Figure 8:
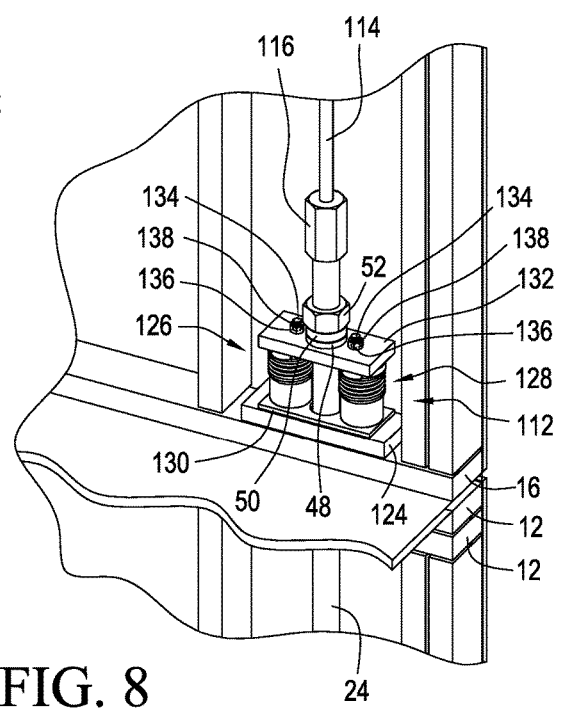
FIG. 8 is a perspective view of a slack absorber assembly of the hold down system of FIG. 7.

Referring to FIG. 8, the slack absorber assembly 112 is preferably disposed on a bearing plate 124, which is supported by the bottom plate 16. The slack absorber assembly 112 includes a left side expansion device 126, a right side expansion device 128, a bottom rigid member 130, a top rigid member 132, threaded rods 134 that extend through openings 136 in the top rigid member 132 and threadedly attached to threaded openings 137 in the bottom rigid member 130. The threaded rods 134 are secured to the top rigid member 132 with nuts 138. The slack absorber assembly 112 uses the male washer 48 and the female washer 50 in the same manner as the slack absorber assembly 44. The nut 52 attaches the slack absorber assembly 112 to the tie rod 24.

The tie rod 114 is smaller in diameter than the tie rod 24 due to the decreased load above the slack absorber assembly 112. The smaller size tie rod 114 advantageously provides for a cost savings. The coupler 116 includes a larger threaded bore at one end for threaded attachment to the tie rod 24 and a smaller threaded bore at the other end for threaded attachment to the tie rod 114. The coupler 116 is described in application Ser. No. 13/424,082, hereby incorporated by reference.

Because the center expansion device 42 is not used, the axial opening 61 through the inner cylindrical member 60 does not have to be sized to accommodate the diameter of the tie rod 24, advantageously providing the flexibility of reducing the overall diameter of the expansion devices to fit within the wall cavity. The overall diameter of the expansion device 40 or 42 is advantageously independent of the diameter of the tie rod 24, since the expansion device 40 or 42 does not surround the tie rod 24 (i.e., the tie rod 24 does not pass through the expansion device 40 or 42). For example, the diameter of the axial opening 61 of the inner cylindrical member 60 can be smaller than the diameter of the tie rod 24, or the axial opening 61 does not have to be provided so that the inner cylindrical member 60 can be made solid. The outside diameter of the inner cylindrical member 60 or the diameter of the axial opening of the outer cylindrical member 62 can even be smaller than the diameter of the tie rod 24. Further, the size of the rods 134 is also irrelevant of the size of the tie rod 24 or 114.

Figure 9:
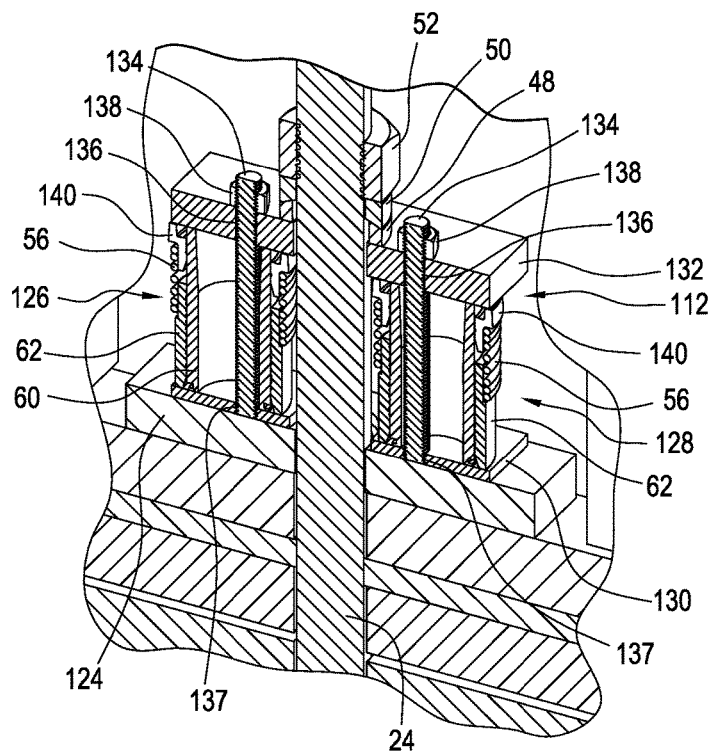
FIG. 9 is a cross-sectional view of the slack absorber assembly of FIG. 8.

Referring to FIG. 9, the expansion devices 126 and 128 are similar to any one of the expansion devices 40, 42 and 44 and work in the same way. The expansion devices 126 and 128 are described in U.S. Pat. No. 7,762,030, herein incorporated by reference. After installation, the nuts 138 are removed to allow the top rigid member 132 to move upwardly under the action of the springs 56 when a slack develops in the tie rod 24. The openings 136 are large enough to allow relative motion between the rod 134 and the top rigid member 132. The removable clips 58 shown in FIG. 3 are not used, since the threaded rods 134 and the nuts 134 provide the same function of holding the compressed springs 56 in place prior to installation. The retainer rings 140 are respectively attached to the inner cylindrical member 60. When the springs 56 expand due to slack in the tie rod 24, inner cylindrical member 60 moves upwardly under the action of the spring 56 while the outer cylindrical members 62 are pressed by the spring 56 against the bottom rigid member 130.

The expansion devices 126 and 128 advantageously carry load offset from the tie rod 24, thereby distributing the load over a larger area. The load is distributed over two expansion devices, thereby allowing each of the expansion devices 126 and 128 to be of smaller sizes that will fit in the limited space inside a wall than if a single expansion device were used.

Figure 10:
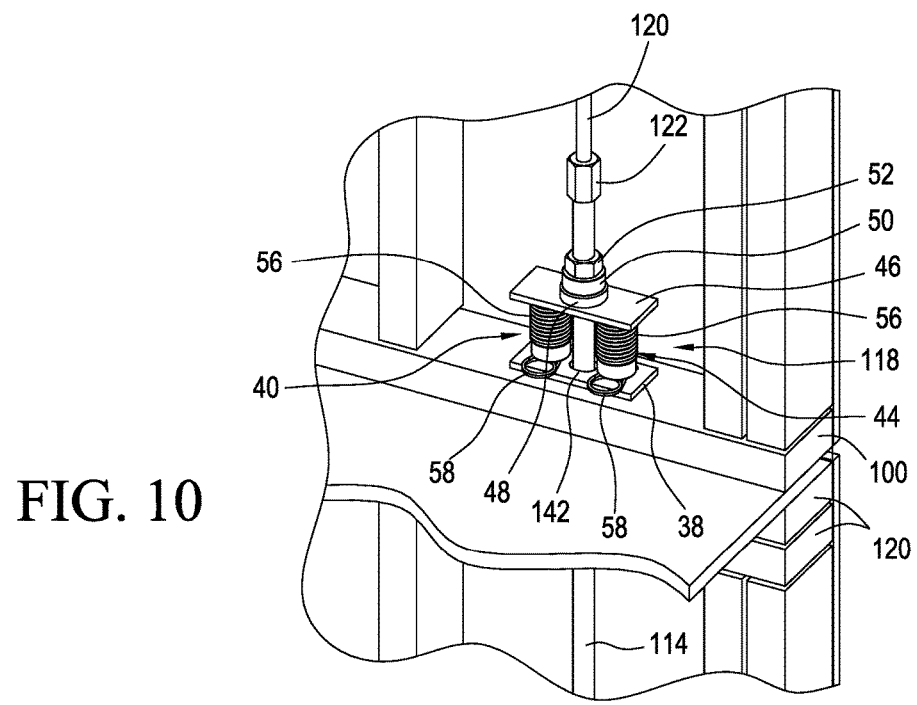
FIG. 10 is a perspective view of a slack absorber assembly of the hold down system of FIG. 7.

Referring to FIG. 10, the slack absorber assembly 118 includes the left expansion device 40 and the right expansion device 44. The slack absorber assembly 118 is similar to the slack absorber assembly 28, except that the center expansion device 42 is not used. The removable clips 58 are removed after installation of the slack absorber assembly 118 to allow the springs 56 to expand to take up any slack in the tie rod 114. The tie rod 120 is smaller in diameter than the tie rod 114 due to the smaller load above the slack absorber assembly 118. The coupler 122 has a smaller threaded bore at one end for attachment to the tie rod 120 and a larger threaded bore at the other end for threaded attachment to the tie rod 114. The opening 142 in the bottom rigid member 38 is advantageously oversized or elongated in the lengthwise direction of the bottom rigid member 38 to allow the tie rod 114 to be off the vertical to the left or to the right to accommodate a less perfect installation. Because the center expansion device 42 is not used, the axial opening 61 through the inner cylindrical member 60 does not have to be sized to accommodate the diameter of the tie rod 114, advantageously providing the flexibility of reducing the overall diameter of the expansion devices to fit within the wall cavity.

Referring to FIG. 11, the building wall 98 is shown with a modified hold down system 114. The slack absorber assembly 28 disposed on the double top plate 104 shown in FIG. 7 has been moved to a position between the bottom plate 100 and the top double plate 104. Reinforcement or jack studs 146 are attached to the studs 106 with nails or screws. The reinforcement studs 146 have bottom ends 148 engaging the bottom plate 100 and top ends 150 supporting a horizontal cross member 152. The cross member 152 is advantageously made of a block of wood which is taller than its width. The slack absorber assembly 28 is supported by the cross member 152.

Referring to FIG. 12, the wooden cross member 152 may be replaced with a solid metal cross member 154.

Referring to FIG. 13, the wooden cross member 152 may be replaced with a structural hollow metal cross member 156, as described in U.S. Pat. No. 9,097,000, incorporated herein by reference. The cross member 156 includes a top wall 158 and a parallel bottom wall 160 connected together with outside vertical walls 162 and inside vertical walls 164. Opening 166 in the top wall 158 and opening 168 in the bottom wall 160 allow the tie rod 120 to extend through the cross-member 156. The vertical walls 162 and 164 join with the top wall 158 and the bottom wall 160 with radius surfaces 170.

Figure 16:
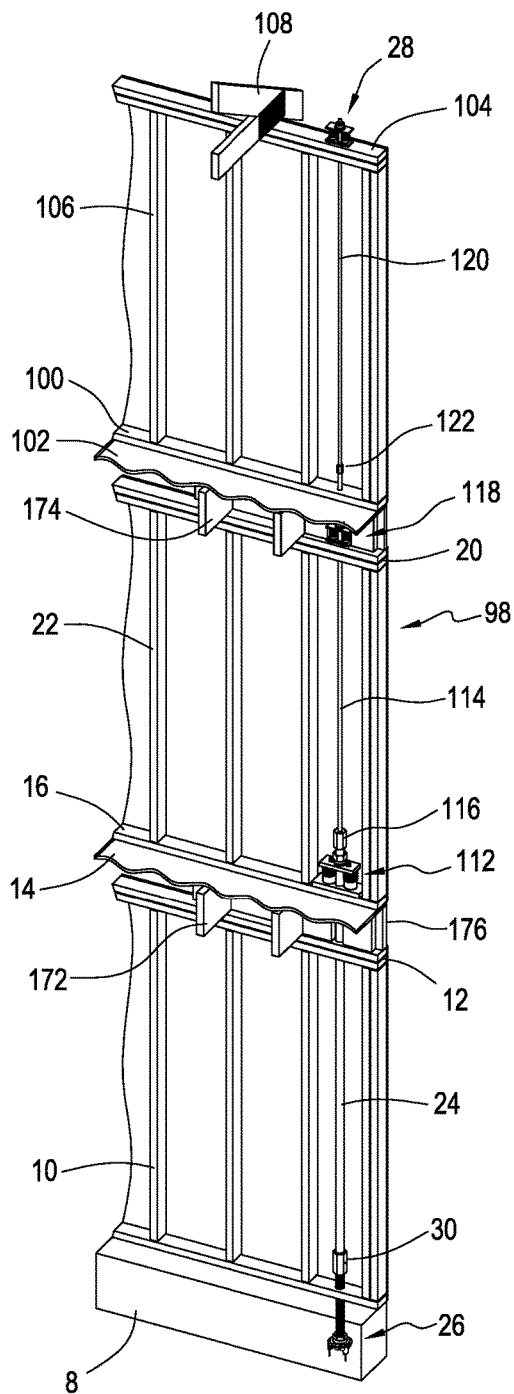
FIG. 16 is a perspective view of a building wall reinforced by a hold down system embodying the present invention.

Referring to FIG. 16, the wall 98 is shown with floor joists 172 disposed between the subfloor 14 and the double top plate 12. Floor joists 174 are also shown disposed between the subfloor 102 and the double top plate 20. A ring joist 176 is disposed between the subfloor 14 and the double top plate 12. Another ring joist 178 is disposed between the subfloor 102 and the double top plate 20.

Figure 17:
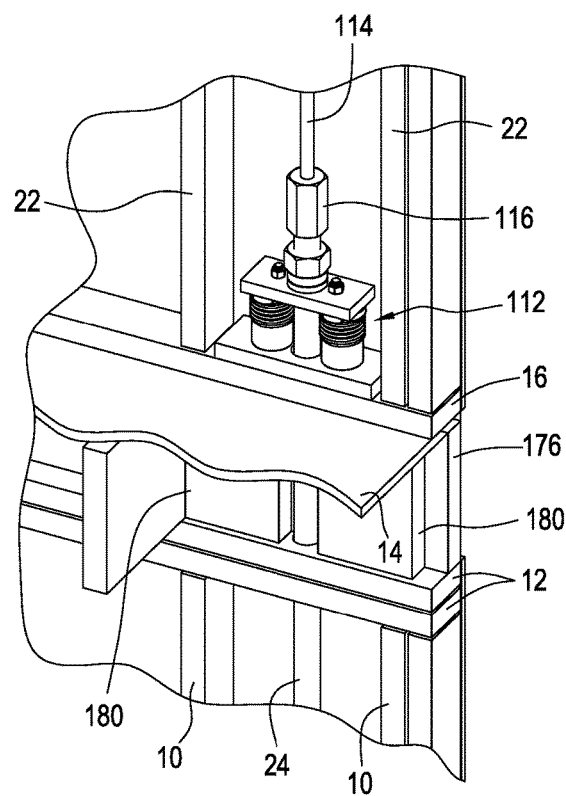
FIG. 17 a perspective view of a slack absorber assembly in the hold down system of FIG. 16.

Referring to FIG. 17, blockings 180 are disposed between the subfloor 14 and the double top plate 12. The blockings 180 advantageously provide additional support to the bottom plate 16 on which the slack absorber assembly 112 is disposed. The load from the slack absorber assembly 112 is advantageously transferred through the blockings 180 to the studs 10 below.

Figure 18:
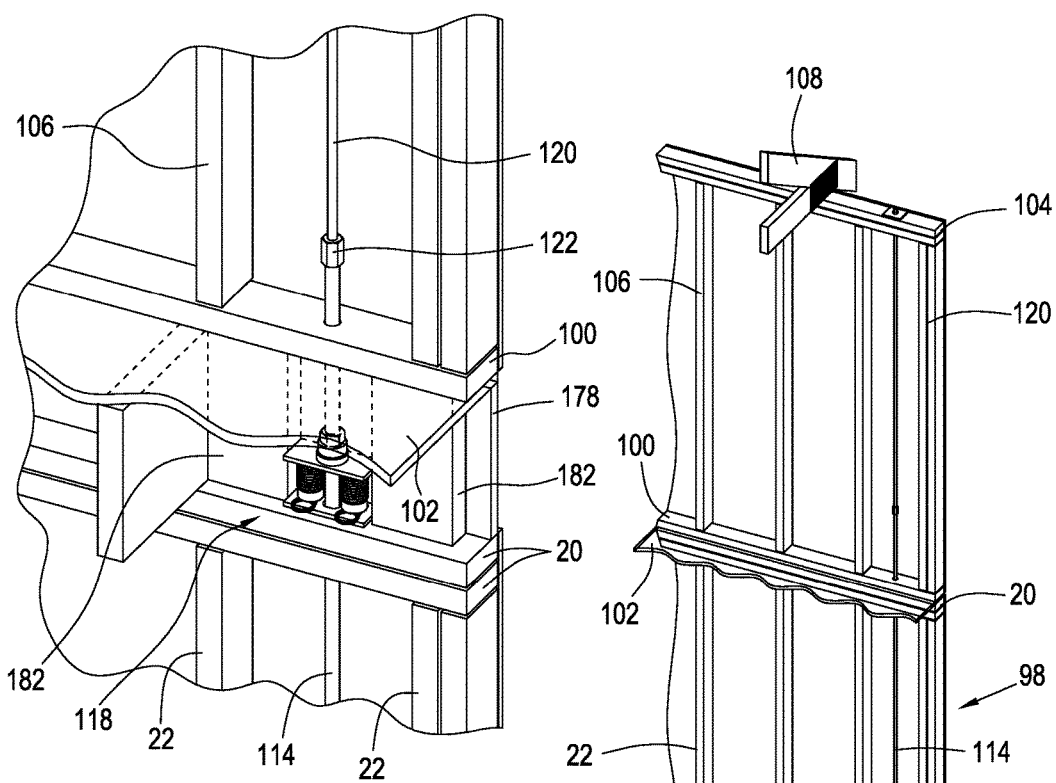
FIG. 18 is an alternative location of the slack absorber assembly shown in FIG. 17.

Referring to FIG. 18, the slack absorber assembly 118 is disposed on the double top plate 20. Blockings 182 are provided on each side of the slack absorber assembly 118. The blockings 182 are disposed between the subfloor 102 and double top plate 20. The location of the slack absorber assembly 118 on the double plate 20 is an alternative location to the bottom plate 100.

Figure 19:
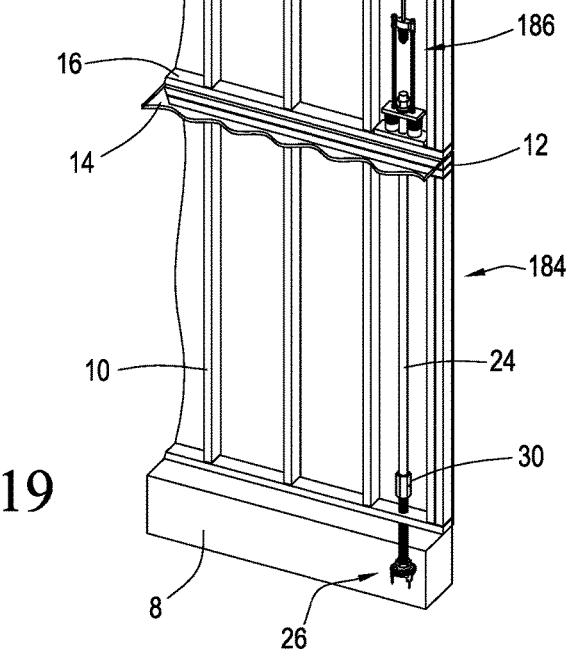
FIG. 19 is a perspective view of a building wall using a hold down system embodying the present invention.
Figure 20:
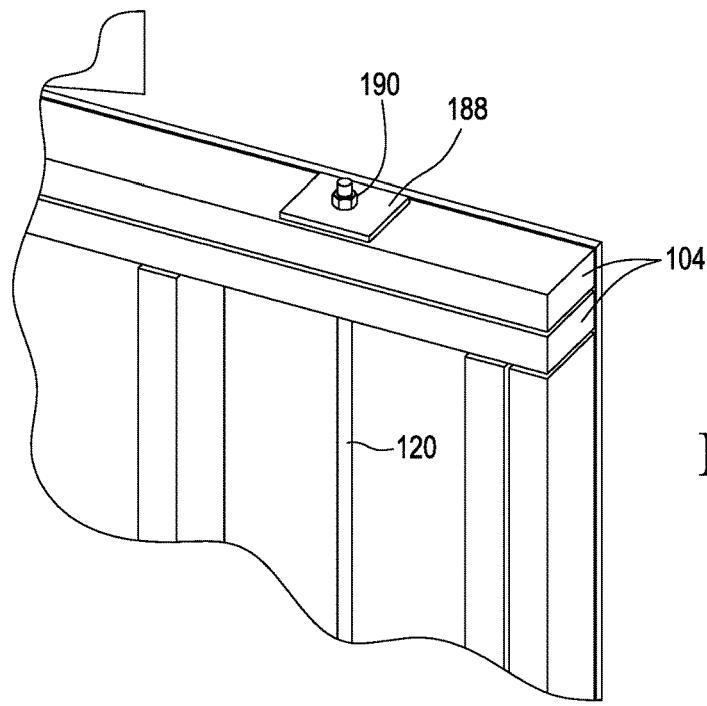
FIG. 20 is a perspective view of a portion of the hold down system of FIG. 19.

Referring to FIG. 19, the building wall 98 is reinforced with a hold down system 184, which includes a slack absorber assembly 186 disposed on the bottom plate 16. The slack absorber assembly 186 advantageously takes up slack from the tie rod 24 and the tie rods 114 and 120. An end portion of the tie rod 20 is tied to the double top plate 104 with a bearing plate 188 and a nut 190, as shown in FIG. 20.

Figure 21:
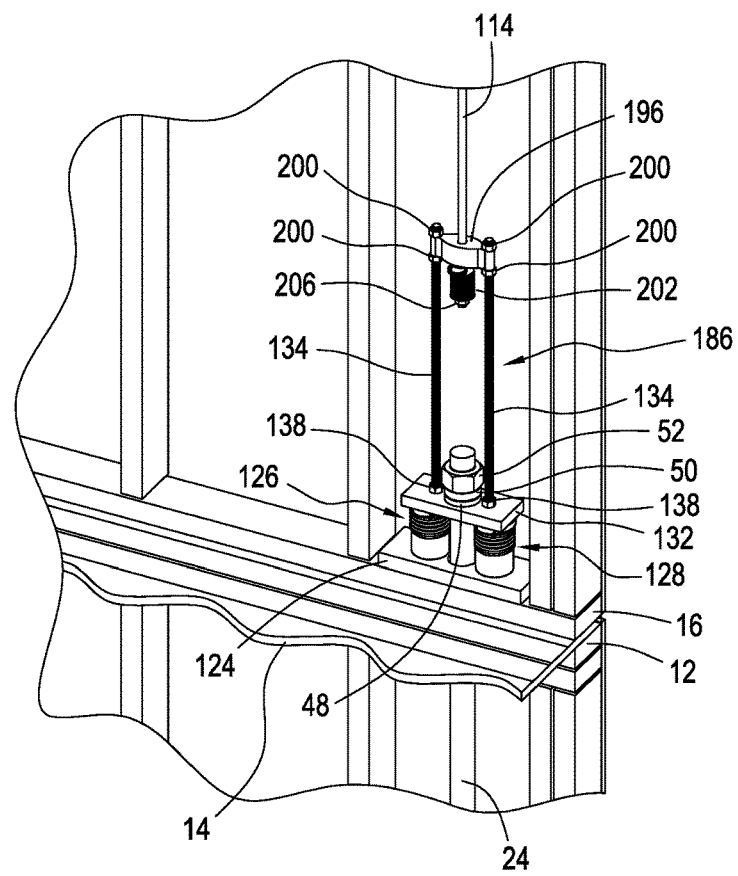
FIG. 21 is a perspective view of a slack absorber assembly in the hold down system shown in FIG. 19.
Figure 22:
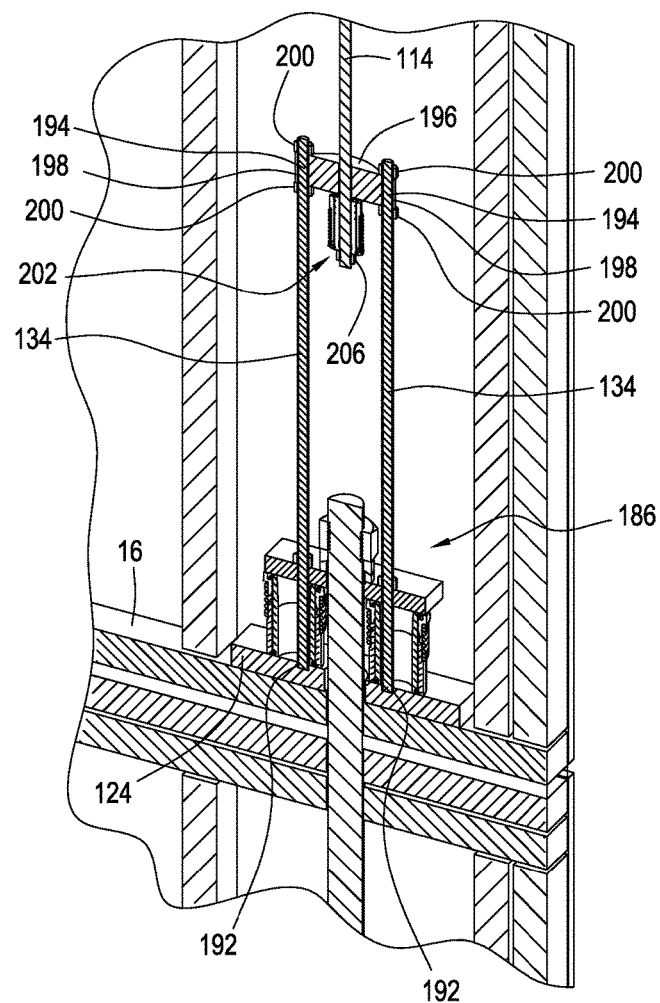
FIG. 22 is a cross-section view of the slack absorber assembly of FIG. 21.

Referring to FIGS. 21 and 22, the slack absorber assembly 186 is similar to the slack absorber assembly 112, shown in FIG. 9, except that the bottom rigid member 130 and the threaded rods 134 have been extended and threadedly attached to respective threaded bores 192 in the bearing plate 124. The nuts 138 are screwed upwardly after installation a sufficient distance above the top rigid member 132 so as not to interfere with upward movement of the top rigid member 132 as the expansion devices 126 and 128 expand upwardly to take up any slack in the tie rod 24.

The upper ends 194 of the threaded rods 134 are fixed to opposite ends of a member 196 through openings 198 and nuts 200. An expansion device 202 identical to the expansion device 40 shown in FIG. 4 is attached to one end of the tie rod 114 that extends through an opening 204 of the member 196. The expansion device 202 advantageously takes up any slack that may develop in the tie rod 114. A nut 206 secures the expansion device 202 to the member 196.

Figure 23:
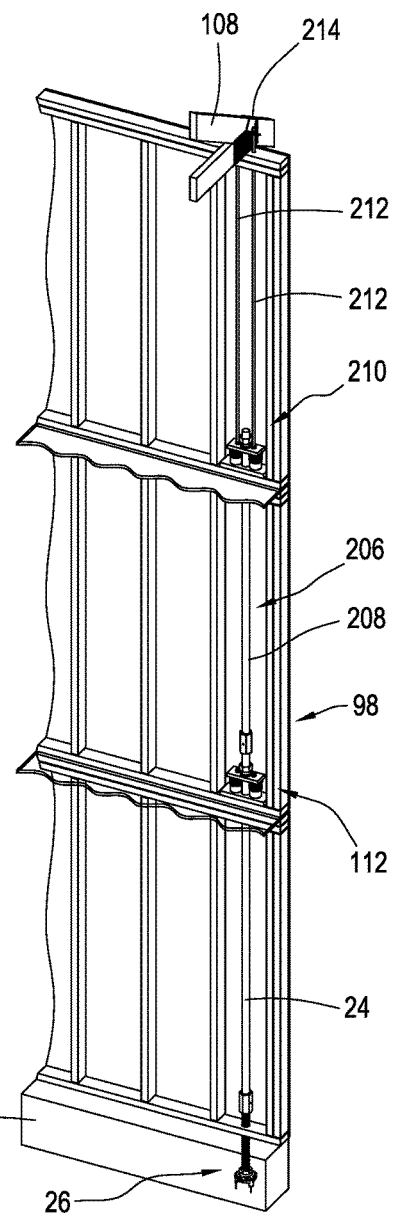
FIG. 23 is a perspective view of a building wall using a hold down system embodying the present invention.

Referring to FIG. 23, the building wall 98 is reinforced with a hold down system 206, which includes the anchor assembly 26, the tie rod 24 and the slack absorber assembly 112, as shown in FIG. 7; a tie rod 208 connected to the tie rod 24, a slack absorber assembly 210 with tie rods 212 secured to a bracket 214 wrapped around the roof truss 108.

The slack absorber assembly 210 is the same as the slack absorber assembly 186, except that the threaded rods 134 are replaced with the tie rods 212 and the member 196 and expansion device 206 are not used.

Figure 24:
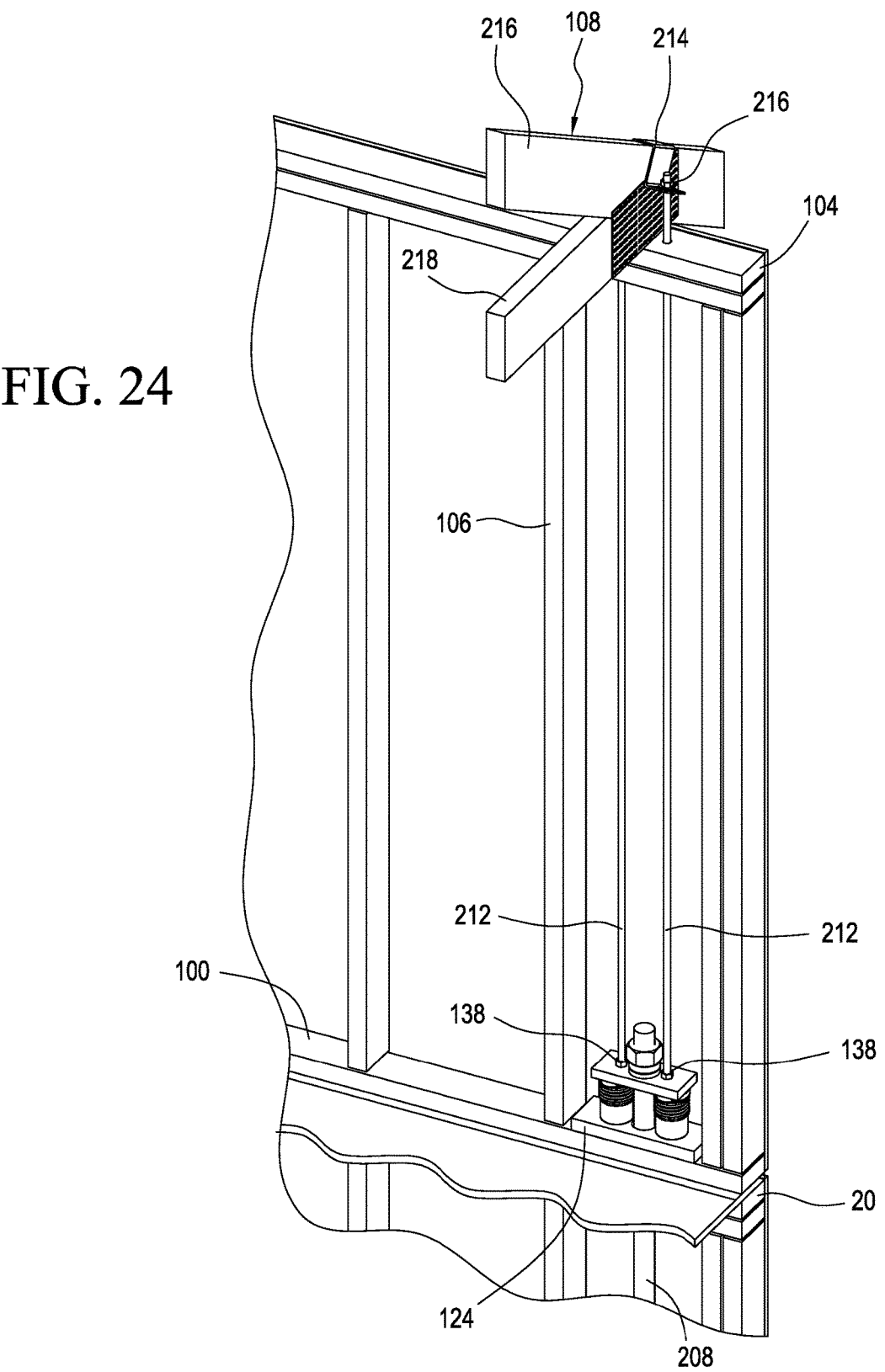
FIG. 24 is perspective view of a slack absorber assembly in the hold down system in FIG. 23.

Referring to FIG. 24, the tie rods 212 are threaded to threaded bores 192 (see FIG. 22) in the bearing plate 124. The tie rods 212 extend through openings in the double top plate 104 and are secured to the bracket 214 with nuts 216. The roof truss 108 is disposed transversely to the double top plate 104 and includes an inclined member 216 and a horizontal member 218. The roof truss 108 is of standard design.

Referring to FIGS. 25, 26 and 27, the bracket 214 includes a U-shaped portion 220 and side flange portions 222. The U-shaped portion 220 is configured to fit over the inclined member 216. The flange portions 222 each includes an elongated or slotted opening 224 to allow the tie rods 212 to extend through the respective openings 224 at an angle with respect to flange portions 222. The openings 224 are disposed on raised arched portions 226 to advantageously allow the nuts 216 to be tightened sufficiently when the nuts 216 are an angle with respect to the flanges 222.

The U-shaped portion 220 includes a preferably planar or flat side wall portions 228 that are parallel to each other and a planar base wall portion 230 perpendicular to the side wall portions 228. The U-shaped portion 220 is configured to fit over and to the sides of the inclined member 216. The flange portions are preferably perpendicular to the side portions 228 and parallel to the base portion 230. The bracket 214 is preferably made from sheet metal.

Figure 28:
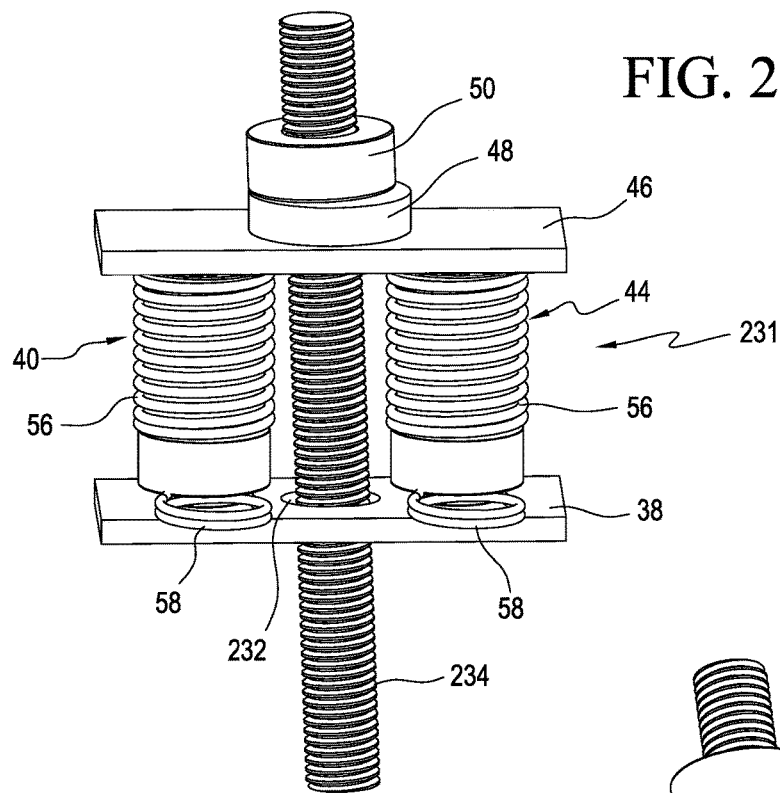
FIGS. 28 and 29 are perspective views of a slack absorber assembly used in a hold down system in any of the building walls shown above.
Figure 29:
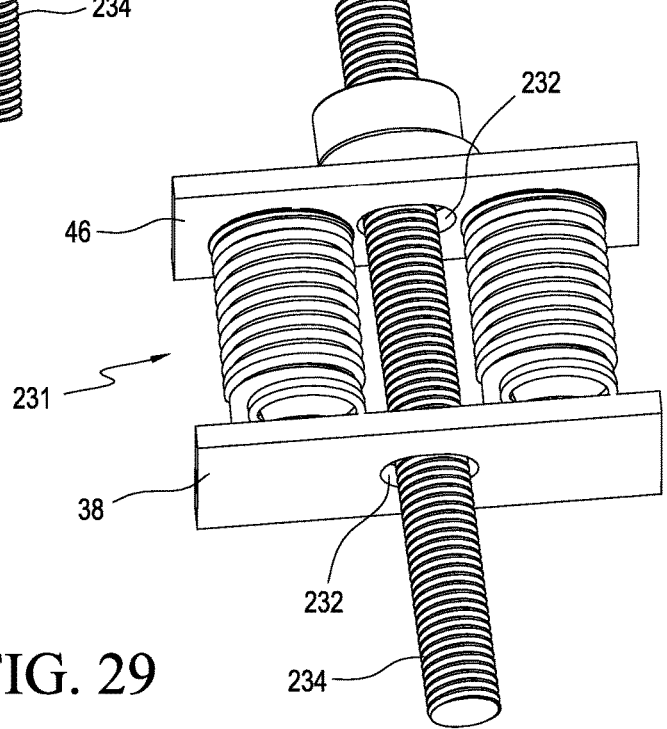

Referring to FIGS. 28 and 29, a slack absorber assembly 231 is disclosed. The slack absorber assembly 231 is similar to the slack absorber assembly 28 shown in FIG. 3, except that the center expansion device 42 is not used. All other parts are designated with the same reference numerals. The slack absorber assembly 231 is advantageously used where the expected load is less than the expected load for the slack absorber assembly 28 such that the center expansion device 42 is not used. Because the center expansion device 42 is not used, the axial opening 61 through the inner cylindrical member 60 does not have to be sized to accommodate the diameter of the tie rod 234, advantageously providing the flexibility of reducing the overall diameter of the expansion devices to fit within the wall cavity. Openings 232 in the bottom rigid member 38 and the top rigid member 46 are oversized with respect to the diameter of the tie rod 234 to allow the tie rod 234 to be off the vertical (due to less than perfect vertical installation) when extending through the openings 232.

Figure 30:
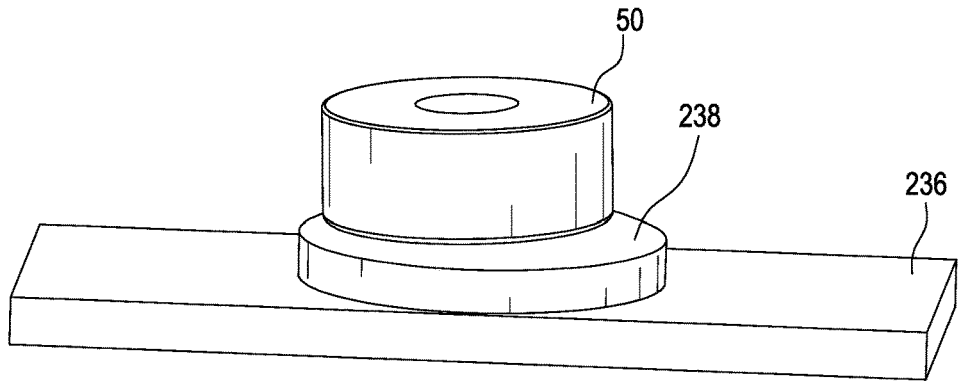
FIG. 30 is a perspective view of the washers used in the slack absorber assembly shown in FIG. 28.
Figure 31:
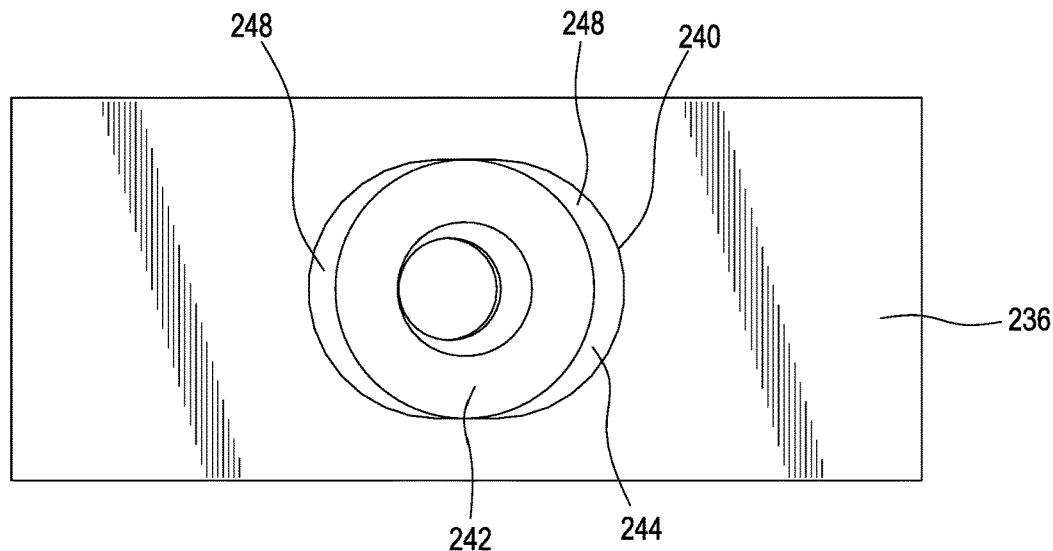
FIG. 31 is a bottom view of FIG. 30.
Figure 32:
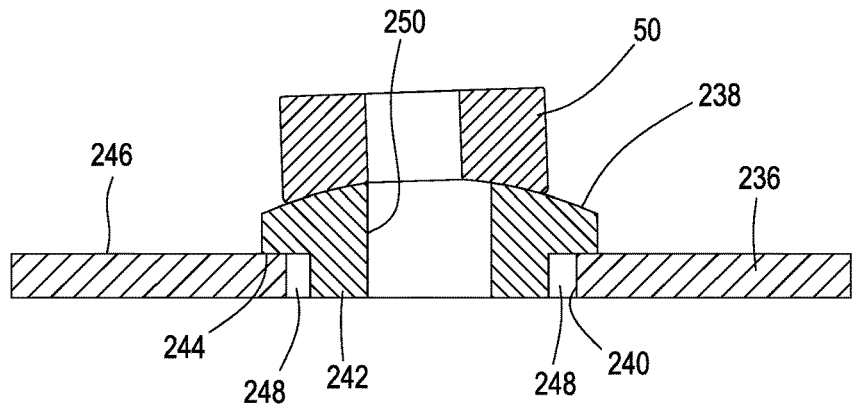
FIG. 32 is a cross-sectional view of FIG. 30.

Referring to FIGS. 30, 31 and 32, the top rigid member 46 shown in FIG. 28 may be replaced with a top bearing 236 and the male washer 48 with male washer 238. The top rigid member 236 has an elongated opening 240, which receives a cylindrical extension portion 242 of the male washer 238. The male washer 238 has an annular flange 244 that sits on a top surface 246 of the top rigid member 236. A gap 248 on each side of the extension portion 242 allows the extension portion 242 to move in either direction to advantageously accommodate the tie rod 234 that may be a few degrees off from the vertical. The elongated opening 240 also allows the top rigid member 236 to be off the horizontal due to uneven expansion of the expansion devices 42 and 44 while maintaining maximum surface contact between the washers 50 and 238 and top rigid member 236. An opening 250 through the male washer 238 is oversized with respect to the diameter of the tie rod to allow the tie rod within the opening to be off from the vertical by a few degrees. The opening of the washer 50 may be threaded to mate with the thread of the tie rod 234 to advantageously eliminate the use of the nut 52, thereby reducing the number of components to save cost and simplify inventory. The washer 50 may be provided with hexagonal flat surfaces in the manner of a standard nut for use with a wrench or other standard tightening tool.

Figure 33:
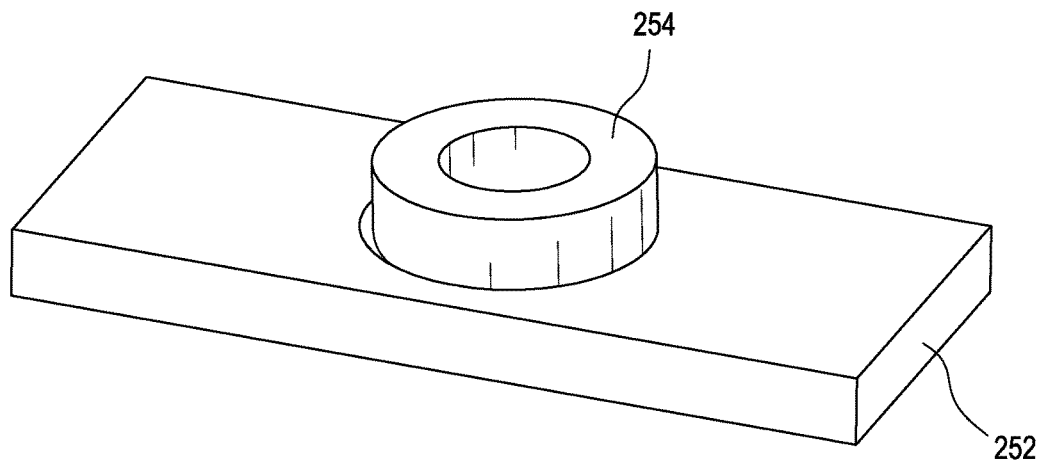
FIGS. 33-35 are alternative embodiments of the washers shown in FIG. 30.
Figure 34:
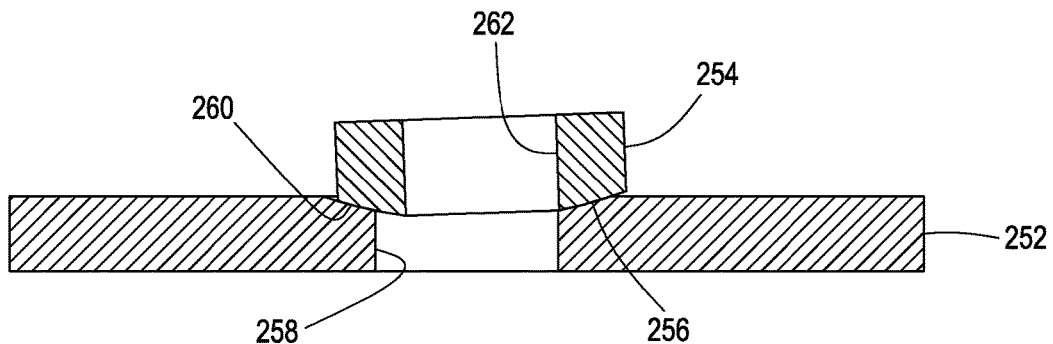

Referring to FIGS. 33 and 34, the top rigid member 46 shown in FIG. 28 may be replaced with a top rigid member 252 and a centering washer 254. The top rigid member 252 has a concave surface 256 around the periphery of an opening 258. The centering washer 254 has a corresponding convex surface 260 around the periphery of an opening 262. The surfaces 256 and 260 are preferably spherical to allow the centering washer 254 to swivel over the opening 258. The opening 258 is oversized with respect to the diameter of the tie rod to allow the tie rod within the opening to be off from the vertical by a few degrees.

Figure 35:
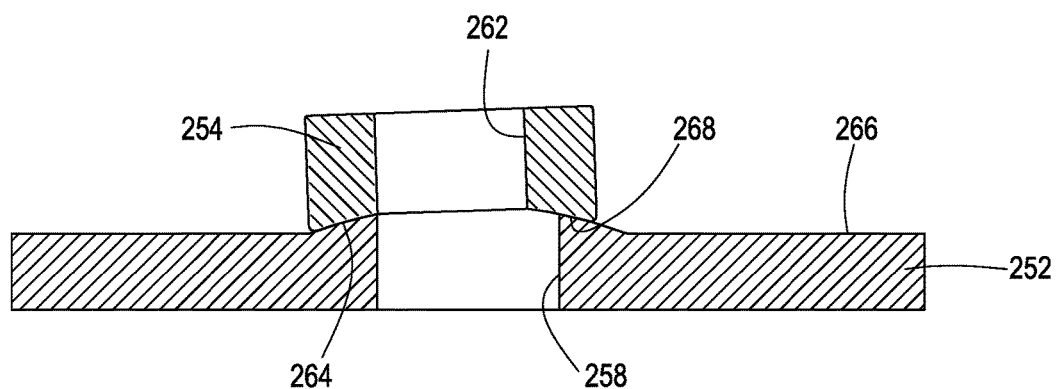

Referring to FIG. 35, the top rigid member 252 may be provided with a convex surface 264 around the periphery of the opening 258 instead of the concave surface 260 shown in FIG. 34. The convex surface 264 rises above the top surface 266 of the top rigid member 252. The centering washer 254 may be provided with a concave surface 268 instead of the convex surface 260 shown in FIG. 34. The surfaces 264 and 268 are preferably spherical surfaces to advantageously allow swiveling motion of the centering washer 254 around the opening 258.

The opening 262 of the washer 254 may be threaded to mate with the thread of the tie rod 234 to advantageously eliminate the use of the nut 52, thereby reducing the number of components to save cost and simplify inventory. The washer 254 may be provided with hexagonal flat surfaces in the manner of a standard nut for use with a wrench or other standard tightening tool.

Figure 36:
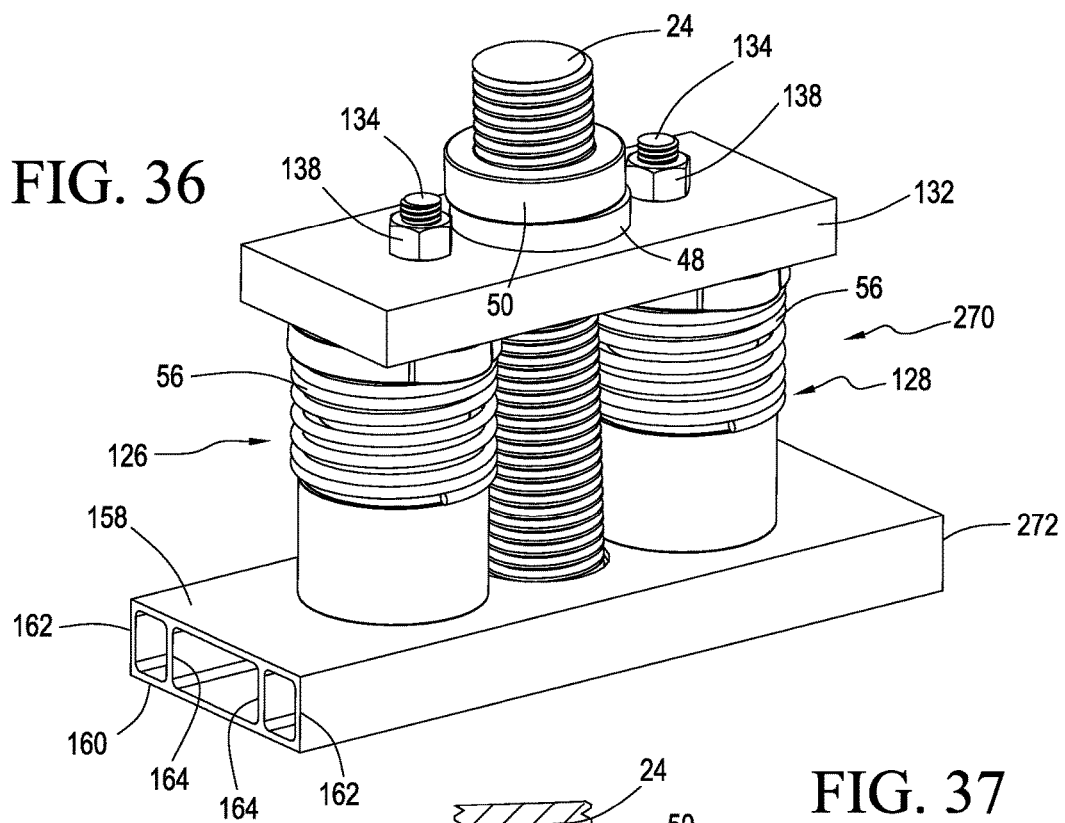
FIG. 36 is a perspective view of a slack absorber assembly used in a hold down system in any of the building walls shown above.

Referring to FIG. 36, a slack absorber assembly 270 is disclosed that is similar to the slack absorber assembly 128 shown in FIGS. 8 and 9, except that the bottom rigid member 130 is replaced with a hollow rigid member 272. The hollow rigid member 272 is structurally the same as the cross-member 156 shown in FIG. 14 so that the same reference numerals are used to designate the various portions of the hollow rigid member 272.

Figure 37:
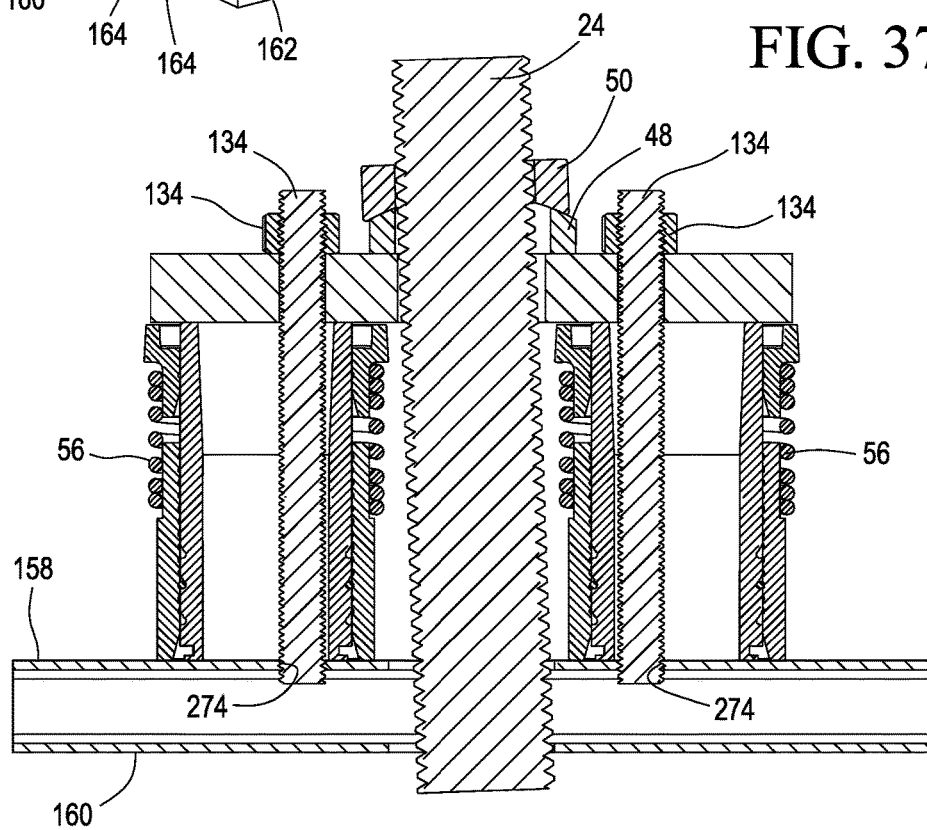
FIG. 37 is a cross-sectional view of the slack absorber assembly shown in FIG. 36.

Referring to FIG. 37, the threaded rods 134 are threaded in threaded openings 274. The nuts 134 keep the slack absorber assembly 270 inactive until after installation at which time the nuts 134 are removed.

Referring to FIG. 38, a slack absorber assembly 276 is disclosed. The slack absorber assembly 276 is similar to the slack absorber assembly 270 shown in FIG. 36, except that the top rigid member 132 is replaced with a hollow rigid member 278, which is structurally the same as the hollow rigid member 272 except for size. Accordingly, the hollow rigid member 278 will not be described further.

Referring to FIG. 39, a slack absorber assembly 278 is disclosed. The slack absorber assembly 278 is similar to the slack absorber assembly 118 shown in FIG. 10, except that the top rigid member 46 is replaced with a hollow rigid member 280, which is tubular and rectangular in cross-section. The hollow rigid member 280 has a top wall 282, a bottom wall 284 and side walls 286. Referring to FIG. 40, the depth of the hollow rigid member 280 is about the same width as the expansion devices 40 and 44. The hollow rigid member 280 is advantageously narrow so that the force from the male washer 48 is transferred laterally to the side walls 286 in the shortest possible distance.

Referring to FIGS. 41, 42 and 43, a slack absorber assembly 288 is disclosed. The slack absorber assembly 288 includes left and right expansion devices 290 disposed on either side of a tie rod 292. Each expansion device 290 works by relative rotational movement between an outer cylindrical member 294 and an inner cylindrical member 296 due to an unwinding of a torsion spring 298. The spring 298 under compression is effective to cause relative rotational motion between the inner cylindrical member 296 and the outer cylindrical member 294. The inner cylindrical member 296 has outer thread 300 that engages with an inner thread 302 of the outer cylindrical member 294. The inner cylindrical member 296 has a flange portion 304 with a radial hole 306 for securing one end of the torsion spring 298. Similarly, the outer cylindrical member 294 has a radial hole 308 for securing the opposite end of the torsion spring 298.

A removable clip 310 is used to prevent relative movement between the inner cylindrical member 296 and the outer cylindrical member 294 during installation. Leg portions 312 are received within circumferential groove 314 at the bottom portion of the inner cylindrical member 296 and extend past the bottom edge 316 of the outer cylindrical member 294, thus preventing relative movement between the inner cylindrical member 296 and the outer cylindrical member 294.

Bolts 318 attach the expansion devices 290 to the top rigid member plate 46. Each of the bolt 318 is threaded to the respective inner thread 320 of each inner cylindrical member 296, thereby fixing the inner cylindrical member 296 to the top rigid member 46.

Once the slack absorber assembly 288 is installed in place at a location within the building wall 98, the clips 310 are removed. The outer cylindrical member 294 is then free to rotate in an unscrewing manner from the inner cylindrical member 296 due to the action of the torsion spring 298 when a slack develops in the tie rod 292. The unscrewing action of the outer cylindrical member 294 extends the length of the expansion device 290, thereby absorbing any slack that develops in the tie rod 292. The inner cylindrical member 296 stays fixed to the top rigid member 46 while the outer cylindrical member 294 is rotatable in the unscrewing direction when a slack develops in the tie rod 292.

Since the expansion devices 290 are disposed outside the tie rod 292 (i.e., the tie rod does not enter and extend through the expansion devices), the respective diameters of the components of the expansion devices 290 can be sized without regard to and is independent of the diameter of the tie rod 292, and vice versa. For example, the diameter of the tie rod 292 is shown as being larger than the diameter of the inner thread 320 of each inner cylindrical member 296. In this case, the diameter of the tie rod 292 can be chosen to be large enough to act as a compression member to take up a compression load. Further, the size of the bolts 318 is also irrelevant of the size of the tie rod 292.

The expansion devices 290 advantageously carry load offset from the tie rod 292, thereby distributing the load over a larger area. The load is distributed over two expansion devices, thereby allowing each of the expansion devices 290 to be of smaller sizes that will fit in the limited space inside a wall than if a single expansion device were used.

Referring to FIG. 44, a slack absorber assembly 322 with an expansion devices 324 and 326, both of which are identical. The expansion device 324 has started to expand due to a slack in the tie rod 328 while the expansion device 326 has remained inactive because the clip 310, due to an omission by the installer, has not been removed. In this situation, the expansion devices 324 and 326 are configured so that both devices advantageously continue to squarely bear on the top rigid member 330. The expansion devices 324 and 326 are similar to the expansion device 40 shown in FIG. 4 but with modifications.

Figures 46, 47:
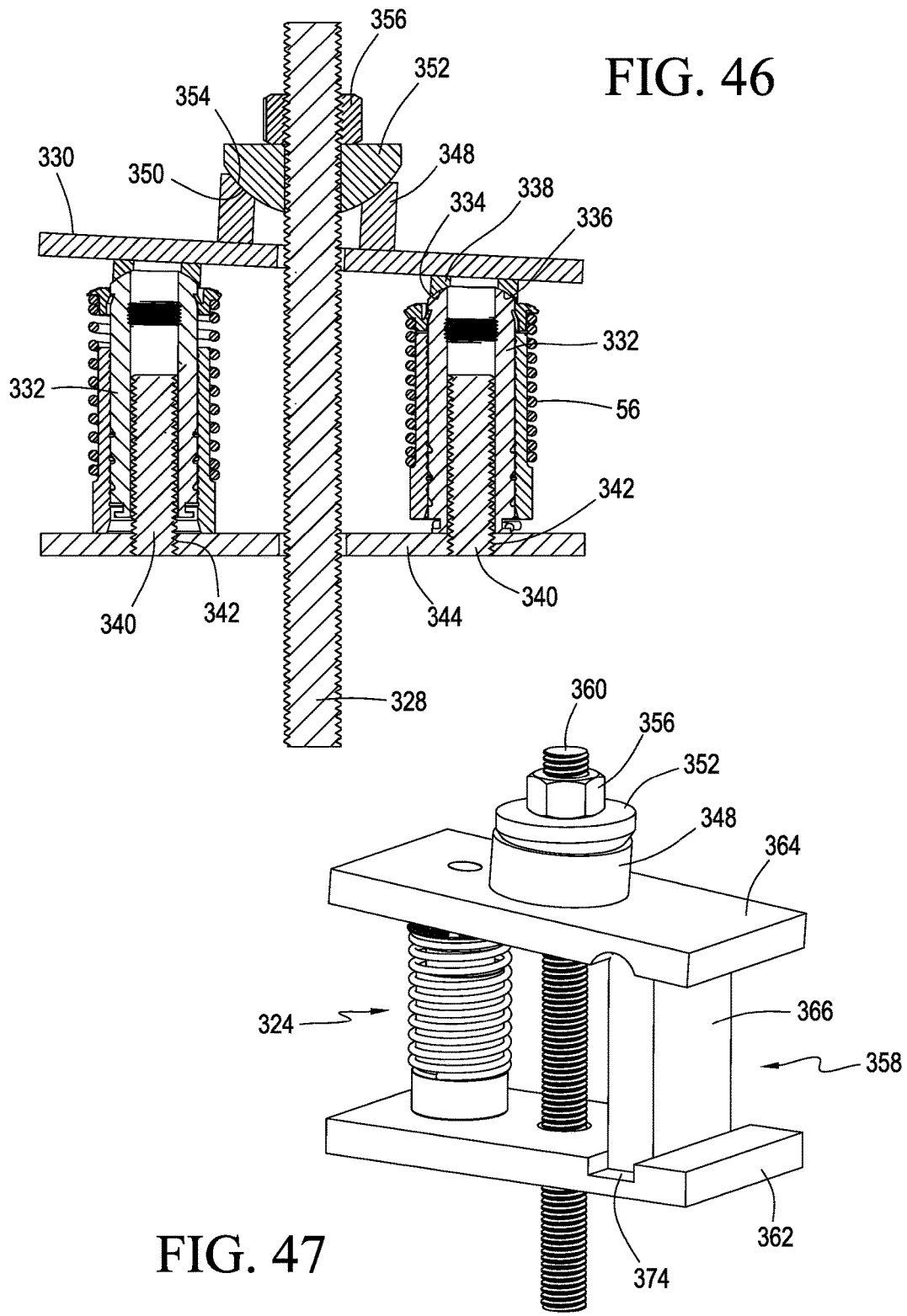
FIG. 46 is a cross-sectional view of the slack absorber assembly shown in FIG. 45.
FIG. 47 is a perspective view of a slack absorber assembly used in a hold down system in any of the building walls shown above.

Referring to FIGS. 45 and 46, each of the expansion devices includes an inner cylindrical member 332 disposed within the outer cylindrical member 68. A resilient member or split ring 333 is received in one of the circumferential grooves 335 in the inner cylindrical member 332 and corresponding circumferential inside grooves 337 in the outer cylindrical member 62. The spring 56 is retained around the outer cylindrical member 68 between the shoulder 68 and the retainer ring 64, which is attached to the inner cylindrical member 332, as already discussed in reference to FIG. 4. The top edge surface 334 of the inner cylindrical member 332 is convex, preferably spherical, that mates with a corresponding bottom concave surface 336 of a washer 338. The washer 338 in combination with the surface 334 allows the washer 338 to swivel, thereby making maximum surface contact with the top rigid member 330, even when the top rigid member 330 is not level.

Threaded rods 340 are threaded to threaded openings 342 in the bottom rigid member 344. The threaded rods 340 are slidably received within the inner cylindrical members 332 to guide the inner cylindrical members 332 in their upward movement as slack develops in the tie rod 328.

A washer 348 includes an upper concave surface 350, preferably spherical. Another washer 352 with a convex surface 354, preferably spherical, mates with the washer 348 to allow the washer 352 to swivel with respect to the washer 348 when the top rigid member 330 is not level. This allows the nut 356 to make maximum surface contact with the washer 352 even when the top rigid member 330 is not level. The opening of the washer 352 may be threaded to mate with the thread of the tie rod 328 to advantageously eliminate the use of the nut 356, thereby reducing the number of components to save cost and simplify inventory. The washer 356 may be provided with hexagonal flat surfaces in the manner of a standard nut for use with a wrench or other standard tightening tool. The uneven expansion of the expansion devices may also be due to some factors, such as manufacturing tolerances, etc. The rounded edge 334 and the mating washer 338 advantageously allow for maximum surface contact with the top rigid member 364 even when the expansion devices do not expand at the same rate.

It should be understood that the washers 350 and 352 are interchangeable with the two washer system shown in FIGS. 6 and 30-32 and the modifications to the top rigid member shown in FIGS. 33-35.

Referring to FIG. 47, a slack absorber assembly 358 is shown after having expanded to take up a slack in the tie rod 360. The slack absorber assembly 358 includes the expansion device 324 and the washers 352 and 348 shown in FIGS. 44-46. The threaded rod 340, which is threaded to the threaded hole 342 in a bottom plate 362, slidably guides the inner cylindrical member 332 in its upward motion as driven by the spring 56 when a slack develops in the tie rod 360. The washer 338 swivels with respect to the convex surface 334 to maintain maximum surface contact with the top rigid member 364.

A support member 366 disposed on the other side of the tie rod 360 provides support to the top rigid member 364 as the expansion device 324 expands to take up the slack that develops in the tie rod 360. The support member 366 includes a rounded upper edge surface 368 that mates with a corresponding rounded groove 370 in the underside of the top rigid member 364. As one side of the top rigid member 364 above the expansion device 324 moves upwardly, the opposite side supported by the support member 366 pivots about the surfaces 368 and 370. The bottom edge portion 372 is held in a groove 374 in the bottom rigid member 362.

In the arrangement of the slack absorber assembly 358, the expansion device 324 carries substantially half the load, the other half being carried by the support member 366. The washers 348 and 352 advantageously provides maximum surface contact between the nut 356 and the washer 352 and between the washer 348 and the top rigid member 364. The washer 338 swivels with respect to the convex surface 334 to maintain maximum surface contact with the top rigid member 364.

Figures 48, 49:
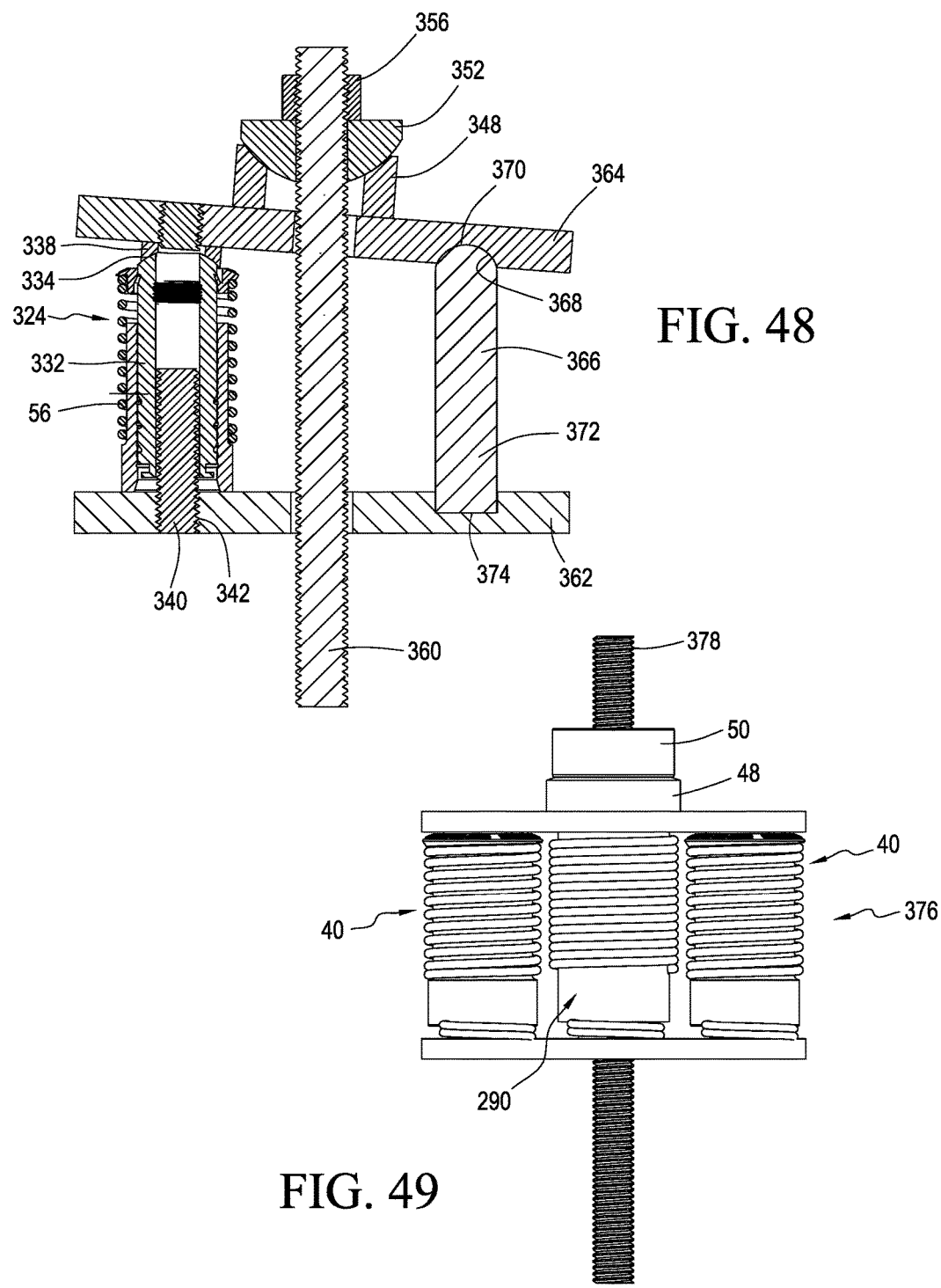
FIG. 48 is a cross-sectional view of the slack absorber assembly shown in FIG. 47.
FIG. 49 is a side elevational view of a slack absorber assembly used in a hold down system in any of the building walls shown above.

Referring to FIGS. 49 and 50, a slack absorber assembly 376 is disclosed. The slack absorber assembly 376 uses the expansion device 40 shown in FIG. 4 on either side of the tie rod 378. The expansion device 290 shown in FIG. 41 is disposed such that the tie rod 378 extends through it. The inner cylindrical member 296 (FIG. 43) is slidably and axially movable relative to length of the tie rod 378 as the expansion device 290 expands to take up the slack in the tie rod 378. The washers 48 and 50 shown in FIG. 6 are also used. In this configuration, the looseness in the expansion devices 40 while in between locking positions (when the resilient member 82 is between two receiving volumes 80, referring to FIG. 4, during the process of expanding) is advantageously taken up by the expansion device 290, which is always engaged, thereby reducing the inherent looseness in the system.

Referring to FIG. 51, a slack absorber assembly 380 is disclosed. The slack absorber assembly 380 includes expansion device 126, also shown in FIG. 8. The expansion devices 126 are disposed between the bottom rigid member 382 and the top rigid member 385 and on either side of the tie rod 384. Threaded rods 386 are attached to the bottom rigid member 382 and are slidably movable through the top rigid member 385 as the expansion devices 126 expand to push the top rigid member 385 upwardly to take up any slack that develops in the tie rod 384. Swivel washers 48 and 50, also shown in FIG. 6, provide maximum surface contact with the top rigid member 385 and the nut 52 to account for uneven expansion of the expansion devices 126.

A split nut assembly 388 is disposed around the tie rod 384. The split nut assembly 388 has a housing 390, which is operatively attached to the bottom rigid member 382 with standard means, such as with bolts 392. A cylindrical nut 394 split axially into equal segments 395, preferably four, is disposed within the housing 390 and threadedly engaged with the tie rod 384. A split ring 396 disposed within a circumferential groove 398 biases the cylindrical nut 394 toward the tie rod 384. The bottom portion of the cylindrical nut 394 includes a bevel or ramp 400 that cooperates with a corresponding circumferential ramp 402 around the bottom portion of the housing 390. A cover 404 is removably attached to the housing 390 with screws 406. A gap 408 is provided between inner vertical surface 410 of the wall 412 and the outer vertical surface 414 of the cylindrical nut 394. A gap 415 is provided between the bottom of the cover 404 and the top of the split nut 394. The gap 408 allows the segments of the cylindrical nut 394 to separate away from the tie rod 384 and disengage when the cylindrical nut 394 hits and presses against the cover 404 after traversing the gap 415 as the tie rod 384 is pulled upwardly by the expansion devices 126 when a slack develops in the tie rod 384. In the same manner, when the wall shrinks and settles, the bottom rigid member 382 moves with the wall, causing the cylindrical nut 394 to press against the cover 404 and thereby separating from the tie rod 384.

The overall diameter of the expansion device 126 is advantageously independent of the diameter of the tie rod 384, since the expansion device 126 does not surround the tie rod 384 (i.e., the tie rod 384 does not pass through the expansion device 126). For example, referring to FIG. 4, the diameter of the axial opening 61 of the inner cylindrical member 60 can be smaller than the diameter of the tie rod 24, or the axial opening 61 does not have to be provided so that the inner cylindrical member 60 can be made solid. The outside diameter of the inner cylindrical member 60 or the diameter of the axial opening of the outer cylindrical member 62 can even be smaller than the diameter of the tie rod 24. Further, the size of the rods 386 are also irrelevant of the size of the tie rod 384.

Figure 52:
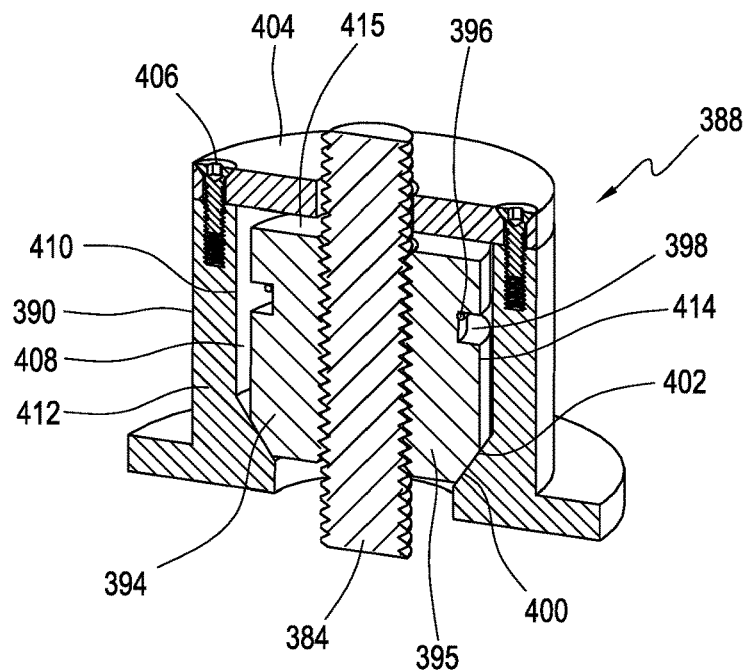
FIG. 52 is cross-sectional view of a split nut assembly shown in FIG. 51.
Figure 53:
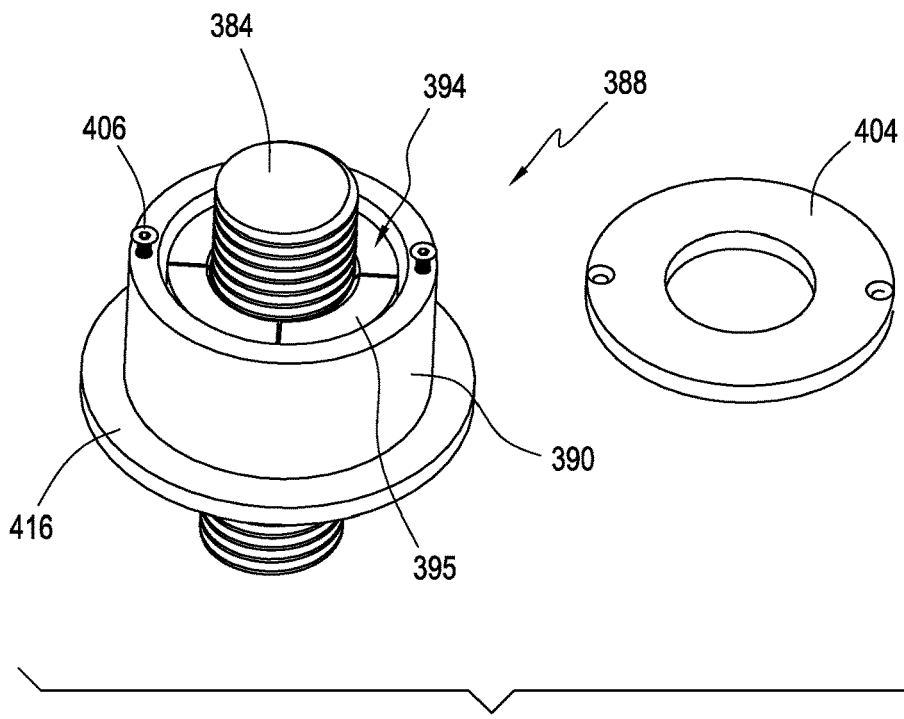
FIG. 53 is a top perspective view of the split nut assembly shown in FIG. 52 with the cover removed.
Figure 54:
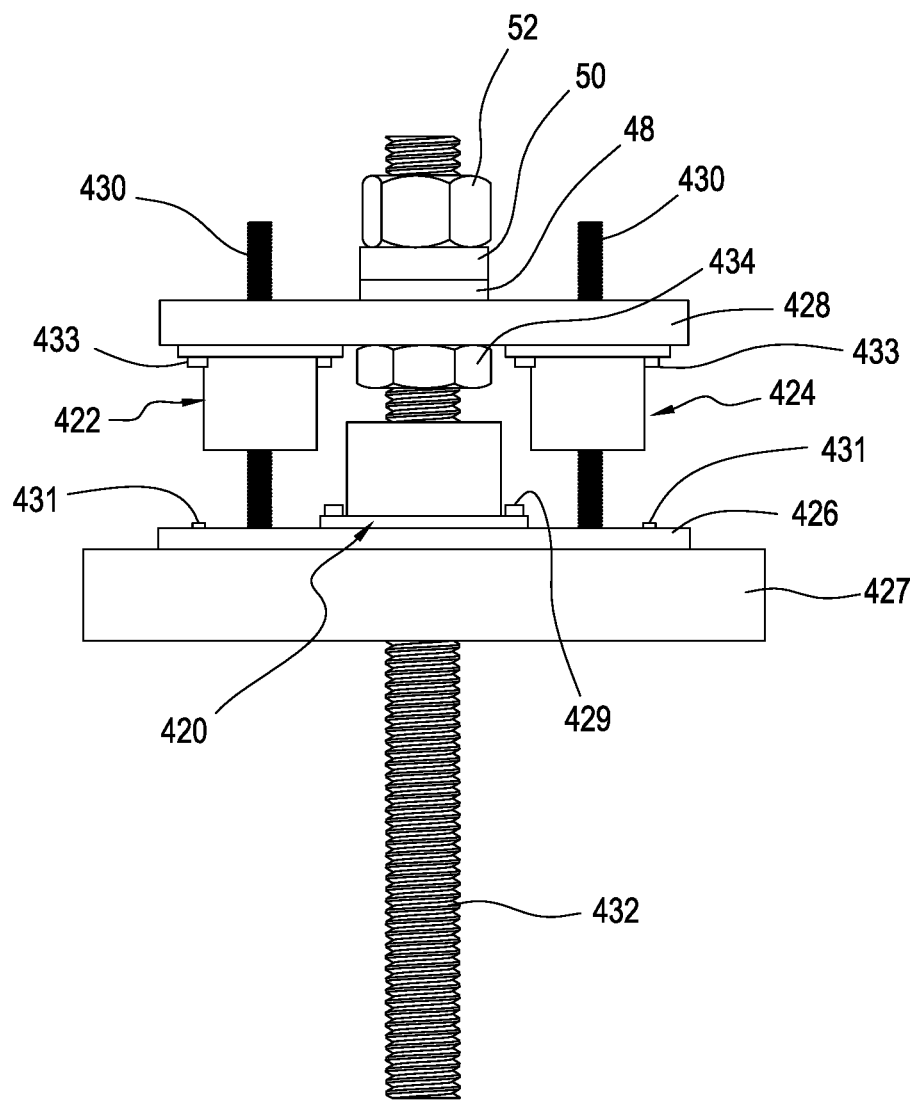
FIG. 54 is perspective view of a slack absorber assembly used in a hold down system in any of the building walls shown above.

Referring to FIG. 54, a slack absorber assembly 418 is disclosed. The slack absorber assembly 418 includes split nut assemblies 420, 422 and 424 disposed between a bottom rigid member 426 and a top rigid member 428. The split nut assemblies 422 and 424 provide support between the bottom rigid member 426 and the top rigid member 428. The split nut assemblies 420-424 are structurally and functionally the same as the split nut assembly 388 shown in FIGS. 52 and 53, including respective cylindrical nuts 394. The split nut assembly 420 is attached to the bottom rigid member 426 with bolts 429 or other standard means. The bottom rigid member 426 is attached with screws 431 or other standard means to the wall structure 427, such as the stud wall base plate. The split nut assemblies 422 and 424 are attached to the 428 with bolts or other standard means. The split nut assemblies 422 and 424 are oriented inverted with respect to the split nut assembly 420. The split nut assemblies 422 and 424 are attached to the top rigid member 428 with bolts 433 or other standard means. Threaded rods 430 and the tie rod 432 cooperate with the respective cylindrical nuts 394 in the same way as already described with the split nut assembly 388 shown in FIGS. 52 and 53. The threaded rods 430 are attached to the bottom rigid member 426, such as by threading into respective threaded holes in the manner shown in FIG. 9. The threaded rods 430 are slidably movable through the top rigid member 428 through respective openings in the manner shown in FIG. 9. A nut 434 attaches the top rigid member 428 to the tie rod 432 such that the top rigid member 428 remains stationary with respect to the tie rod 432.

The tie rod 432 due to its relatively larger diameter (larger than what is required for the load) acts as a post such that when the wall shrinks or settles, the slack absorber assembly 418 moves with the wall, since the bottom plate 426 is attached to the wall structure 427. The threaded rods 430 moves with the bottom plate 426, causing the respective cylindrical nuts 394 in the split nut assemblies 422 and 424 to press against the respective covers 404 and disengage from the respective threaded rods 430. When movement ceases, the respective split rings 396 bias the segments 395 to engage the respective threaded rods 430 and the tie rod 432. When uplift occurs due to wind or other forces, the respective cylindrical nuts 394 will engage the respective threaded rods 430 and the tie rod 432 from the cooperating actions of the respective ramp surfaces 400 of the respective cylindrical nuts pressing against the corresponding respective ramp surfaces 402 of the respective housings.

Figure 55:
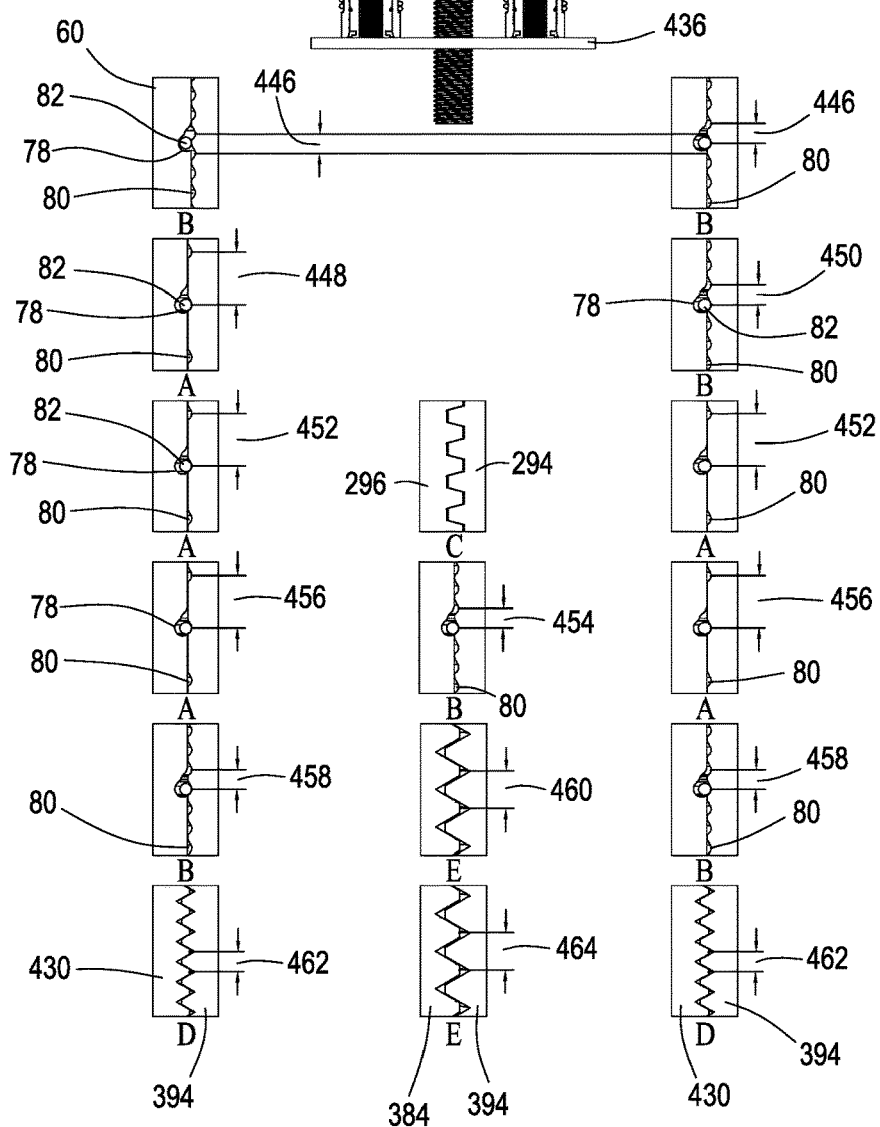
FIG. 55 is an illustration of various combinations of the slack absorber assemblies disclosed herein.

Referring to FIG. 55, devices A, B, C, D and E are disclosed in various configurations between the bottom rigid member 436 and the top rigid member 438. Devices A and B are the same type as the expansion device 126 disclosed in FIG. 9. Device C is the same type as the expansion device 290 without the bolt 318 as shown in FIG. 43. Devices D and E are split nut assemblies 388 of the type shown in 52 and 53.

Where there are three devices shown in a row, the middle device is disposed in the center with the tie rod 440 extending through the middle device. The tie rod 440 is able to move relative to the middle device. The threaded rods 442 are attached to the bottom rigid member 436 and provide a guide for the upward movement of the left and right devices.

In the following discussion, the various configurations are labeled as B-B, A-B, A-C-A, A-B-A, B-E-B and D-E-D.

In the B-B configuration, the left device B is offset from the right device B so that they do not lock at the same time. This effectively shortens the locking distance 446, which is the distance between the receiving volumes 80, and therefore, reduces the looseness in the system. When one of the devices is locked, as shown for the right device, the resilient member 82 of the other device will be between two adjacent receiving volumes, as shown for the left device. This effectively shortens the locking distance by about a half. The distance 446 for the device B on the left is equal to the distance 446 on the device B on the right. The illustrated distance 446 is 0.0750 in. For the arrangement shown, there is locking every 0.0375 in. without shortening the distance 446 between the receiving volumes 80. Shortening the distance 446 is not preferable to avoid shearing of the receiving volumes 80 during load conditions. The configuration advantageously makes system tighter to effectively withstand the load it is designed for.

In the A-B configuration, the distance 448 in the device A between adjacent volumes 80 is longer than the distance 450 for the device B. In the illustrated example, the locking distance 448 of the device A is 0.2000 in. versus the locking distance 450 of 0.0750 in. of the device B. This means that the device B will lock about two times before the device A locks. This ensures that there will be more chances that one of the devices will be locked at any time to hold the tie rod 384 tight to the foundation against any uplift forces, thereby decreasing the looseness in the system without decreasing the strength of the components. The configuration advantageously makes system tighter to effectively withstand the load it is designed for.

In the A-C-A configuration, the center device C is always engaged to take up the entire load when the devices A are between locking positions. The distances 452 are equal to each other, for example 0.2000 in. The looseness of the relatively long distance 452 is advantageously absorbed by the threads of the center device C. The configuration advantageously makes system tighter to effectively withstand the load it is designed for.

In the A-B-A configuration, the locking distance 454 for the center device B is shorter than the locking distance 456 for the devices A. The configuration ensures that the center device B is locked more times than the outlying devices A. As an example, the distance 454 is 0.0750 in. while the distance 456 is 0.2000 in. This configuration advantageously reduces the looseness of the outlying devices A by having the center device with shorter locking distance 454. The configuration advantageously makes system tighter to effectively withstand the load it is designed for.

In the B-E-B configuration, the device E is attached to the bottom rigid member 436. The tie rod 384 is relatively larger in diameter (larger than what is required for the load) so that it acts as a post. When the wall shrinks and settles downwardly, the split nut opens up and moves downwardly to engage the lower thread portion. The outlying devices B will expand to take up the slack between the nut 444 and the top rigid member 438. The locking distance 458 for the devices B is illustrated at 0.0750 in. while the thread pitch 460 for the screw threads is longer, illustrated at 0.1429 in. This will insure that the devices B are locked when the split nut is still open, thereby taking up the looseness in the system. The configuration advantageously makes system tighter to effectively withstand the load it is designed for.

In the D-E-D configuration, as already described in connection with FIG. 54, the shorter thread pitch 462 for the devices D as compared to the thread pitch 464 of device E allows for tightness of the assembly in case the threads of the device E do not engage completely due to a movement of less than the thread pitch of the device E. The thread pitch 462 is illustrated as 0.0769 in. while the thread pitch 464 is 0.1429 in.

With the use of combination of expansion devices with different locking distances, looseness in the system is advantageously reduced to make the system tighter to effectively withstand the load it is designed for.

It should be understood that other combinations are also possible, such as D-D, E-E, E-B and C-C. Further, any one of the devices A, B, C, D and E may be used in the configuration shown in FIG. 47, in lieu of the expansion device 324.

Figures 56, 57:
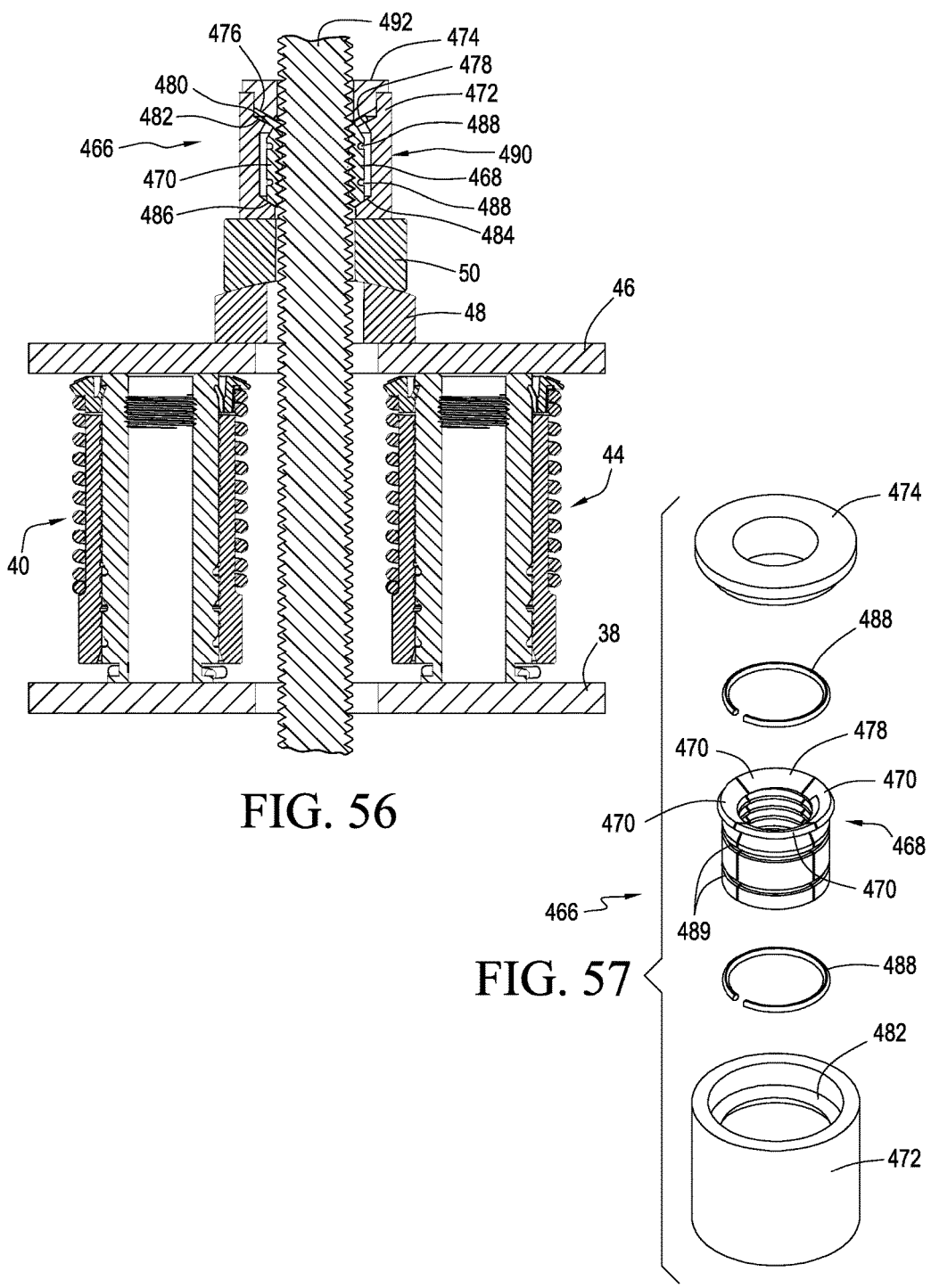
FIG. 56 is cross-sectional view of a slack absorber assembly shown in FIG. 10 using a split nut assembly.
FIG. 57 is an assembly view of the split nut assembly shown in FIG. 56.

Referring to FIG. 56, the standard nut 52 is replaced with a split nut assembly 466. The split nut assembly 466 is similar to the split nut assembly 388 shown in FIGS. 52 and 53. A nut 468 split axially into four segments 470 are disposed inside a housing 472. A cover 474 is screwed to the housing 472. The cover 474 includes an inside conical surface 476 that cooperates with a circumferential flange 478 at the upper portion of the nut 468. A circumferential groove 480 is provided between the conical surface 476 and an inside conical surface 482 at the inside upper portion of the housing 472. The inside bottom portion of the housing 472 includes a conical surface 484 that cooperates with corresponding conical surface 486 at the bottom portion of the nut 468. Resilient split rings 488 disposed in respective circumferential grooves 489 hold the segments 470 of the nut 468 together. Space 490 between the nut 468 and the inside surface of the housing 472 allows the nut 468 to expand and disengage from the thread of the tie rod 486.

In operation, when the split nut 468 is slid down the tie rod 492 until it engages the washer 50. With the application of a downward force, the conical surface 476 causes the circumferential flange 478 to rise into the groove 480, thereby forcing the opening of the nut 468. When a downward force is exerted on the tie rod 492, the nut 468 tightens around the tie rod 492 from the action of the bottom conical surface 486 against the housing conical surface 484.

It should be understood that the split nut assembly 468 may be used in any of the slack absorber assemblies disclosed herein in lieu of the nuts 52, 356 and 444.

Figure 58:
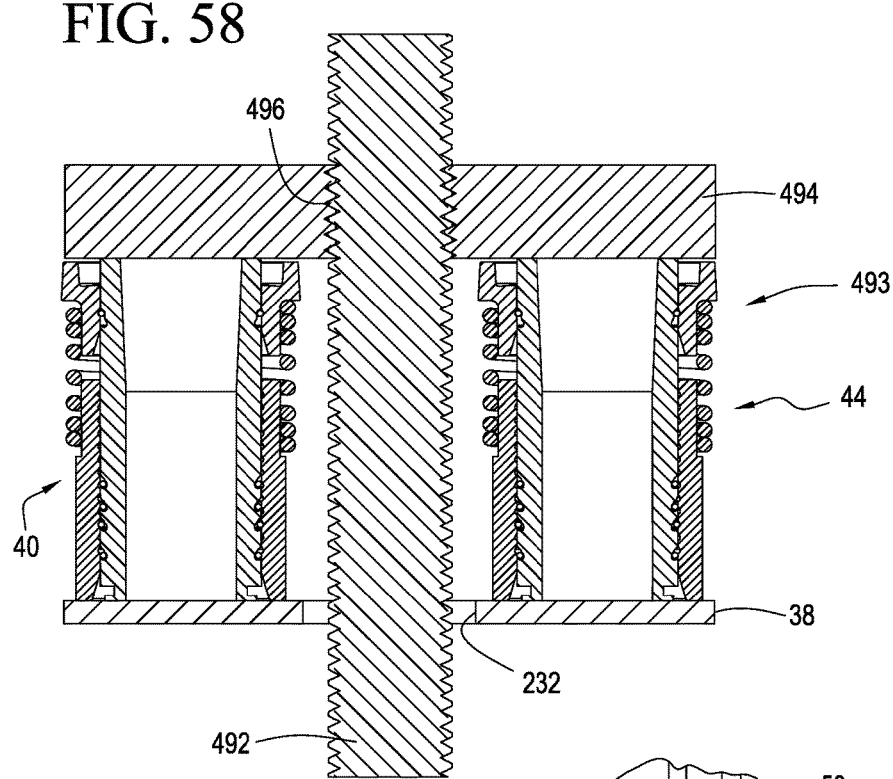
FIG. 58 is a cross-sectional view of a slack absorber assembly embodying the present invention.

Referring to FIG. 58, a slack absorber assembly 493 is provided with a top rigid member 494 with a threaded opening 496 that mates with the thread on the tie rod 492. The threaded top rigid member 494 advantageously eliminates the use of the standard nut 52. The slack absorber assembly 493 is similar to the slack absorber assembly 231 shown in FIG. 28, except that the washers 48 and 50 and the nut 52 (shown in FIG. 3, for example) is not used. The tie rod 492 due to its relatively larger diameter (larger than what is required for the load) acts as a post such that when the wall shrinks or settles, the expansion devices 40 and 44 expands downwardly to take up any gap that develops between the bottom rigid member 38 and the horizontal wall structure, such as the wall bottom plate 16 or 100, on which the bottom rigid member 38 rests. The opening 232 is oversized to avoid interference with the tie rod 492 during the downward expansion of the slack absorber assembly 493.

Figure 59:
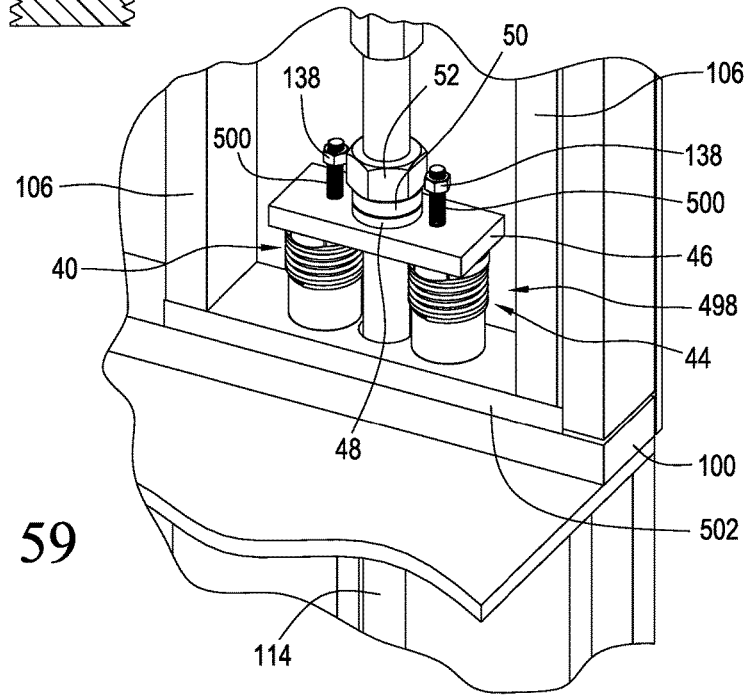
FIG. 59 is a perspective view of a slack absorber assembly embodying the present invention.

Referring to FIG. 59, the slack absorber assembly 112 shown in FIG. 9 is modified as slack absorber assembly 498 with elongated threaded rods 500 and an extended bottom rigid member 502 that extends below the bottom ends of the studs 106. The placement of the bottom rigid member 502 advantageously provides additional bearing surface on the wall bottom plate 100 and additional load bearing connections with the wall. In addition to the load imposed by the expansion devices 40 and 44, the studs 106 provide additional load transfer to the wall.

The nuts 138 after installation of the slack absorber assembly 498 are unscrewed a distance from the top rigid member 46. This allows the expansion devices 40 and 44 to expand only to the limit of the positions of the nuts 138, as the top rigid member 46 moves upwardly along the threaded rods 500. The nuts 500 disposed a distance from the top rigid member 46 advantageously act as stops for the top rigid member 46 and the expansion devices 40 and 44 such that the inner cylindrical member 60 will not overshoot the outer cylindrical member 62 during expansion, thereby insuring that the inner cylindrical member 60 remains locked to the outer cylindrical member 62 when a downward force is exerted by the top rigid member 46 when the wall is subjected to lift or shear forces during a storm, earthquake, etc.

It should be understood that the various expansion devices described herein are interchangeable with one another in any of the various slack absorber assemblies disclosed herein. For example, the expansion device 290 may be substituted for the expansion devices variously labeled as 40, 42, 44, 126, 128, 324, and 326 or the split nuts variously labeled as 388, 422 and 424.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A hold down system for a building wall, comprising:
 a) a first rigid member and a second rigid member, the second rigid member being vertically spaced apart from the first rigid member, the first rigid member is supported on a horizontal member of a stud wall, the first and second rigid members including first and second openings, respectively;
 b) a tie-rod with a lower end portion for being anchored to an anchorage, the tie-rod extending transversely through the first and second openings, the tie-rod dividing the first and second rigid members into a first lateral section on one side of the tie-rod and a second lateral section on a diametrically opposite side of the tie-rod;
 c) first support and second support disposed between the first and second rigid members, the first support being disposed in the first lateral section, the second support being disposed in the second lateral section, the tie-rod extending through the first and second rigid members outside of the first support or the second support, a distance between the first rigid member and the second rigid member through at least one of the first support and the second support is variable; and
 d) the tie-rod is operably attached to the second rigid member so that tension loading on the tie-rod is transferred by the second rigid member to the first and second supports to subject the first and second supports to compression loading, thereby causing the first rigid member to press on the horizontal member of the stud wall via the first and second lateral sections of the first rigid member, thus distributing the compression loading.

2. The hold down system as in claim 1, wherein the first support and the second support include a first spring and a second spring, respectively, the first and second springs are under compression between the first and second rigid members such that any slack that later develops in the tie-rod is taken up by expansion of the first and second springs.

3. The hold down system as in claim 2, wherein:
 a) each of the first spring and the second spring is associated with a first cylindrical member disposed within a second cylindrical member;
 b) one of the first and second cylindrical members being movable relative to another one of the first and second cylindrical members in a first direction; and
 c) the first and the second spring is operably attached to the respective first and second cylindrical members to urge the one of the first and second cylindrical members in the first direction.

4. The hold down system as in claim 3, wherein:
 a) the first cylindrical member includes a rounded top edge;
 b) a washer disposed between the top edge and the second rigid member; and
 c) the washer includes a concave surface complementary to the rounded top edge.

5. The hold down system as in claim 3, and further comprising:
 a) a retainer ring attached to an upper portion of the first cylindrical member; and
 b) the first spring or the second spring is attached to the retainer ring and to the second cylindrical member.

6. The hold down system as in claim 5, wherein:
 a) the upper portion of the first cylinder includes an annular recess; and
 b) the retainer ring includes flexible fingers disposed in the annular recess.

7. The hold down system as in claim 3, wherein the one of the first and second cylindrical members is lockable relative to the another one of the first and second cylindrical members in a second direction opposite to the first direction to prevent the first or the second spring from compressing to its prior position after the first or the second spring have expanded to take up the slack in the tie-rod.

8. The hold down system as in claim 7, wherein:
 a) the first and second cylindrical members include first and second opposing cylindrical walls, respectively;
 b) the first opposing cylindrical wall includes a plurality of first receiving volumes;
 c) the second opposing cylindrical wall includes a plurality of second receiving volumes;
 d) a resilient member disposed between the first and second opposing cylindrical walls, the resilient member is biased to occupy one of the first and second receiving volumes;
 e) the first and second receiving volumes are configured in cross-section such that when the one of the first and second cylindrical members is moved in the first direction relative to the another one of the first and second cylindrical members, the resilient member is shifted into and fully received within another one of the first and second volumes; and
 f) the first and second receiving volumes are configured in cross-section such that when the one of the first and second cylindrical members is pushed in the second direction relative to the one of the first and second cylindrical members, the resilient member is only partially received within the one of the first and second receiving volumes to preclude movement of the one of the first and second cylindrical members.

9. The hold down system as in claim 8, wherein:
 a) the second receiving volumes are disposed from one another at a distance;
 b) the distance of the second receiving volumes of the first support are equal to the distance of the second receiving volumes of the second support; and
 c) the second receiving volumes of the first support is offset from the second receiving volumes of the second support.

10. The hold down system as in claim 8, wherein:
a) the second receiving volumes of the first support are disposed from one another at a first distance;
b) the second receiving volumes of the second support are disposed from one another at a second distance; and
c) the first distance is longer than the second distance.

11. The hold down system as in claim 8, and further comprising:
a) a third support disposed laterally between the first and the second supports;
b) the tie-rod extending through the third support;
c) the support including a third spring associated with a third cylindrical member disposed within a fourth cylindrical member;
b) one of the third and fourth cylindrical members being movable relative to another one of the third and second cylindrical members in the first direction; and
c) the third spring is operably attached to the respective third and fourth cylindrical members to urge the one of the third and fourth cylindrical members in the first direction.

12. The hold down system as in claim 11, wherein:
a) the third and fourth cylindrical members include third and fourth opposing cylindrical walls, respectively;
b) the third opposing cylindrical wall includes a plurality of third receiving volumes;
c) the fourth opposing cylindrical wall includes a plurality of fourth receiving volumes;
d) a second resilient member disposed between the third and fourth opposing cylindrical walls, the second resilient member is biased to occupy one of the third and fourth receiving volumes;
e) the third and fourth receiving volumes are configured in cross-section such that when the one of the third and fourth cylindrical members is moved in the first direction relative to the another one of the third and fourth cylindrical members, the second resilient member is shifted into and fully received within another one of the third and fourth receiving volumes; and
f) the third and fourth receiving volumes are configured in cross-section such that when the one of the third and fourth cylindrical members is pushed in the second direction relative to the one of the third and fourth cylindrical members, the second resilient member is only partially received within the one of the third and fourth receiving volumes to preclude movement of the one of the third and fourth cylindrical members.

13. The hold down system as in claim 12, wherein:
a) the second receiving volumes of the first support are disposed from one another at a first distance;
b) the second receiving volumes of the second support are disposed from one another at a second distance;
c) the first distance is equal to the second distance;
d) the fourth receiving volumes of the third support are disposed from one another at a second distance; and
e) the first distance is longer than the second distance.

14. The hold down system as in claim 11, wherein:
a) a third cylindrical member threadedly disposed within the fourth cylindrical member;
b) one of the third and fourth cylindrical members being rotatably movable relative to another one of the third and fourth cylindrical members so as to advance in the first direction; and
c) the third spring is operably attached to the third and fourth cylindrical members to rotate the one of the third and fourth cylindrical members to advance in the first direction when a slack develops in the tie-rod.

15. The hold down system as in claim 8, and further comprising:
a) a third support disposed laterally between the first and the second supports;
b) the third support includes a split nut axially movable within a housing;
c) the tie-rod extends through the housing and the split nut;
d) the housing is attached to the first rigid member;
e) the split nut disengages from the tie-rod rod when the first rigid member moves downwardly with the horizontal member; and
f) the split nut engages the tie-rod when the first rigid member moves upwardly with the horizontal member.

16. The hold down system as in claim 15, wherein:
a) the second receiving volumes of the first support are disposed from one another at a first distance;
b) the second receiving volumes of the second support are disposed from one another at a second distance;
c) the first distance is equal to the second distance;
d) the split nut includes a thread pitch; and
e) the thread pitch is longer than the first distance or the second distance.

17. The hold down system as in claim 3, wherein:
a) the first cylindrical member threadedly disposed within the second cylindrical member;
b) one of the first and second cylindrical members being rotatably movable relative to another one of the first and second cylindrical members so as to advance in the first direction; and
c) the first or the second spring is operably attached to the first and second cylindrical members to rotate the one of the first and second cylindrical members to advance in the first direction when a slack develops in the tie-rod.

18. The hold down system as in claim 1, wherein:
a) the first support includes a spring under compression between the first and second rigid members such that any slack that later develops in the tie-rod is taken up by expansion of the spring; and
b) said second support includes a member with a bottom end portion attached to the first rigid member and a top end portion pivotably attached to the second rigid member.

19. The hold down system as in claim 18, wherein:
a) the spring is associated with a first cylindrical member disposed within a second cylindrical member;
b) one of the first and second cylindrical members being movable relative to another one of the first and second cylindrical members in a first direction; and
c) the spring is operably attached to the respective first and second cylindrical members to urge the one of the first and second cylindrical members in the first direction.

20. The hold down system as in claim 19, wherein the one of the first and second cylindrical members is lockable relative to the another one of the first and second cylindrical members in a second direction opposite to the first direction to prevent the spring from compressing to its prior position after the spring has expanded to take up the slack in the tie-rod.

21. The hold down system as in claim 19, wherein:
a) the first cylindrical member is threadedly disposed within the second cylindrical member;

b) one of the first and second cylindrical members being rotatably movable relative to another one of the first and second cylindrical members so as to advance in the first direction; and
c) the spring is operably attached to the first and second cylindrical members to rotate the one of the first and second cylindrical members to advance in the first direction when a slack develops in the tie-rod.

22. The hold down system as in claim 1, wherein:
a) the first and second supports each includes a split nut axially movable within a housing;
b) a threaded rod with one end attached to the first rigid member and another end extending through the second rigid member;
c) the first rigid member is attached to the horizontal member so that the first rigid member moves with the horizontal member;
d) the housing is attached to the second rigid member;
e) the split nut disengages from the threaded rod when the first rigid member moves downwardly with the horizontal member, thereby taking up a slack between the first and second rigid members; and
f) the split nut engages the threaded rod when the first rigid member moves upwardly with the horizontal member, thereby locking the first rigid member to the second rigid member.

23. The hold down system as in claim 22, and further comprising:
a) a third support disposed laterally between the first and the second supports;
b) the third support includes a second split nut axially movable within a second housing;
c) the tie-rod extends through the second housing and the second split nut;
d) the second housing is attached to the first rigid member;
e) the second split nut disengages from the tie-rod rod when the first rigid member moves downwardly with the horizontal member; and
f) the split nut engages the tie-rod when the first rigid member moves upwardly with the horizontal member.

24. The hold down system as in claim 23, wherein:
a) the split nut of the first and second supports includes a first thread pitch;
b) the split nut of the third support includes a second thread pitch;
c) the first thread pitch is smaller than the second thread pitch.

25. The hold down system as in claim 22, wherein the second opening of the second rigid member is threaded to the tie-rod.

26. The hold down system as in claim 22, wherein:
a) a nut is threaded to the tie-rod to exert pressure on the second rigid member; and
b) another nut is threaded to the tie-rod below the second rigid member such that the second rigid member is fixed to the tie-rod.

27. The hold down system as in claim 1, wherein the second opening of the second rigid member is threaded to the tie-rod.

28. The hold down system as in claim 1, wherein a nut is threaded to the tie-rod to exert pressure on the second rigid member.

29. The hold down system as in claim 28, and further comprising:
a) first and second washers disposed between the nut and the second rigid member;
b) the first washer includes a concave surface;
c) the second washer includes a convex surface complementary to the concave surface; and
d) the concave surface and the convex surface engage each other.

30. The hold down system as in claim 28, wherein:
a) a surface around the second opening in the second rigid member is concave; and
b) a washer disposed between the nut and the second rigid member, the washer includes a convex surface complementary to the concave surface.

31. The hold down system as in claim 28, wherein:
a) a surface around the second opening in the second rigid member is convex; and
b) a washer disposed between the nut and the second rigid member, the washer includes a concave surface complementary to the convex surface.

32. The hold down system as in claim 1, wherein the first rigid member and the second rigid member are flat solid metal.

33. The hold down system as in claim 1, wherein the first rigid member and the second rigid member are flat hollow metal.

34. The hold down system as in claim 1, wherein the first rigid member is flat hollow metal.

35. The hold down system as in claim 1, wherein the second rigid member is flat hollow metal.

36. A building, comprising:
a) a stud wall above a foundation, the stud wall including a horizontal member;
b) a first rigid member and a second rigid member, the second rigid member being vertically spaced apart from the first rigid member, the first rigid member is supported on the horizontal member of the stud wall, the first and second rigid members including first and second openings, respectively;
c) a tie-rod with a lower end portion anchored in the foundation, the tie-rod extending transversely through the first and second openings, the tie-rod dividing the first and second rigid members into a first lateral section on one side of the tie-rod and a second lateral section on a diametrically opposite side of the tie-rod;
d) first support and second support disposed between the first and second rigid members, the first support being disposed in the first lateral section, the second support being disposed in the second lateral section, a distance between the first rigid member and the second rigid member through at least one of the first support and the second support is variable; and
e) the tie-rod is operably attached to the second rigid member so that tension loading on the tie-rod is transferred by the second rigid member to the first and second supports to subject the first and second supports to compression loading, thereby causing the first rigid member to press on the horizontal member of the stud wall via the first and second lateral sections of the first rigid member, thus distributing the compression loading.

37. The building as in claim 36, wherein the horizontal member is a top plate of the stud wall.

38. The building as in claim 36, wherein the horizontal member is a bottom plate of the stud wall.

39. The building as in claim 36, wherein the horizontal member is a cross member supported by a pair of jack studs.

40. An expansion device, comprising:
a) a first cylindrical member disposed within a second cylindrical member, the first and second cylindrical members being movable relative to another one of the first and second cylindrical members in a first direction; and b) a spring operably attached to the first cylindrical member and the second cylindrical member to urge the one of the first and second cylindrical members in the first direction;

c) a retainer ring attached to an upper portion of the first cylindrical member;

d) the spring is attached to the retainer ring and to the second cylindrical member;

e) the upper portion of the first cylindrical member including an annular recess; and f) the retainer ring including flexible fingers disposed in the annular recess.

* * * * *